Figure 9:
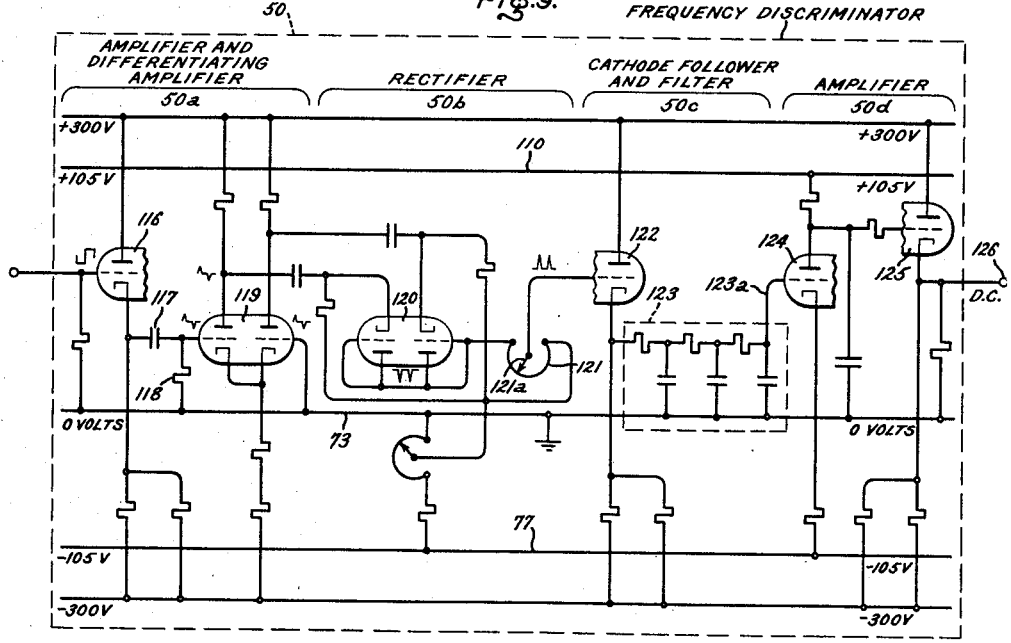

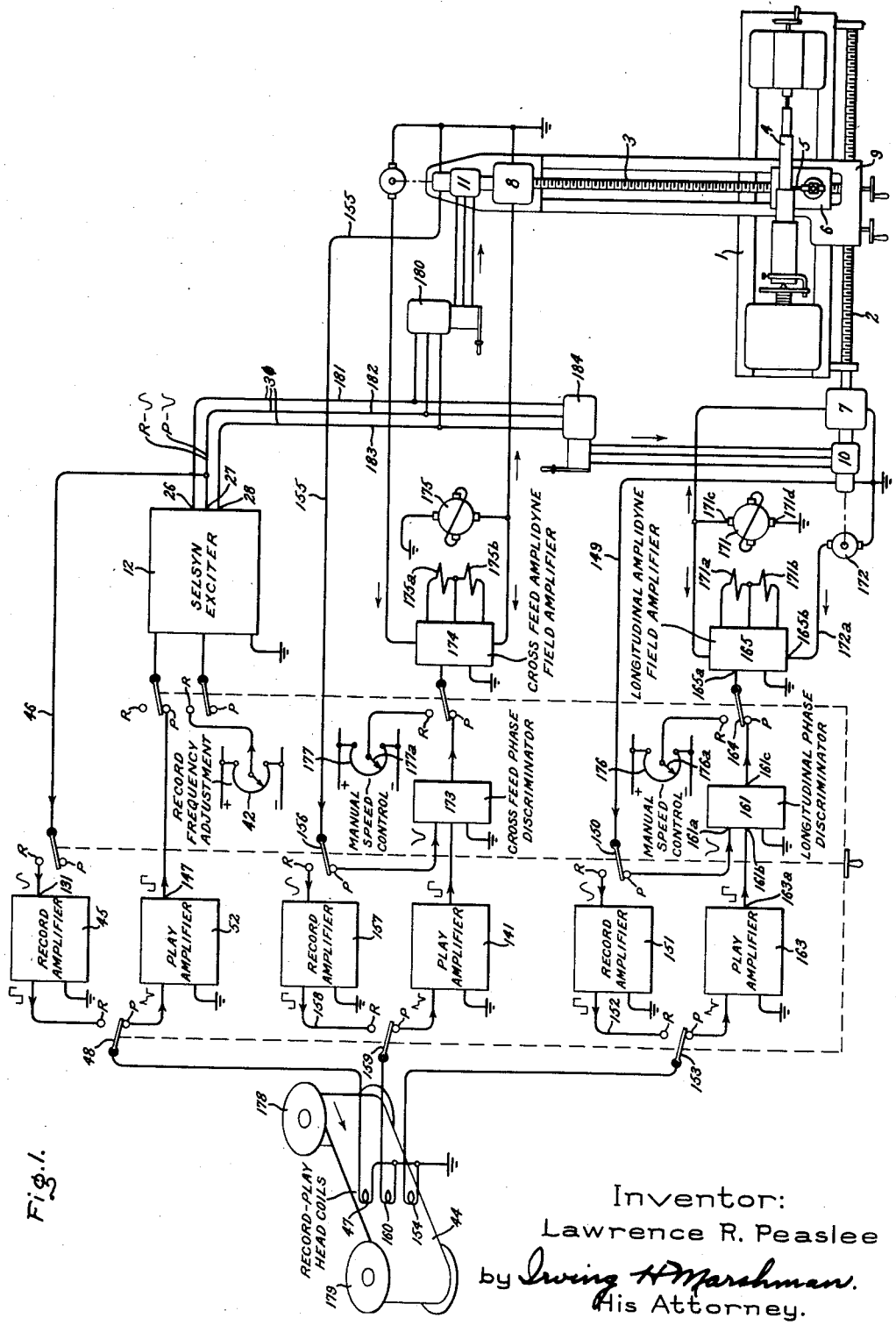

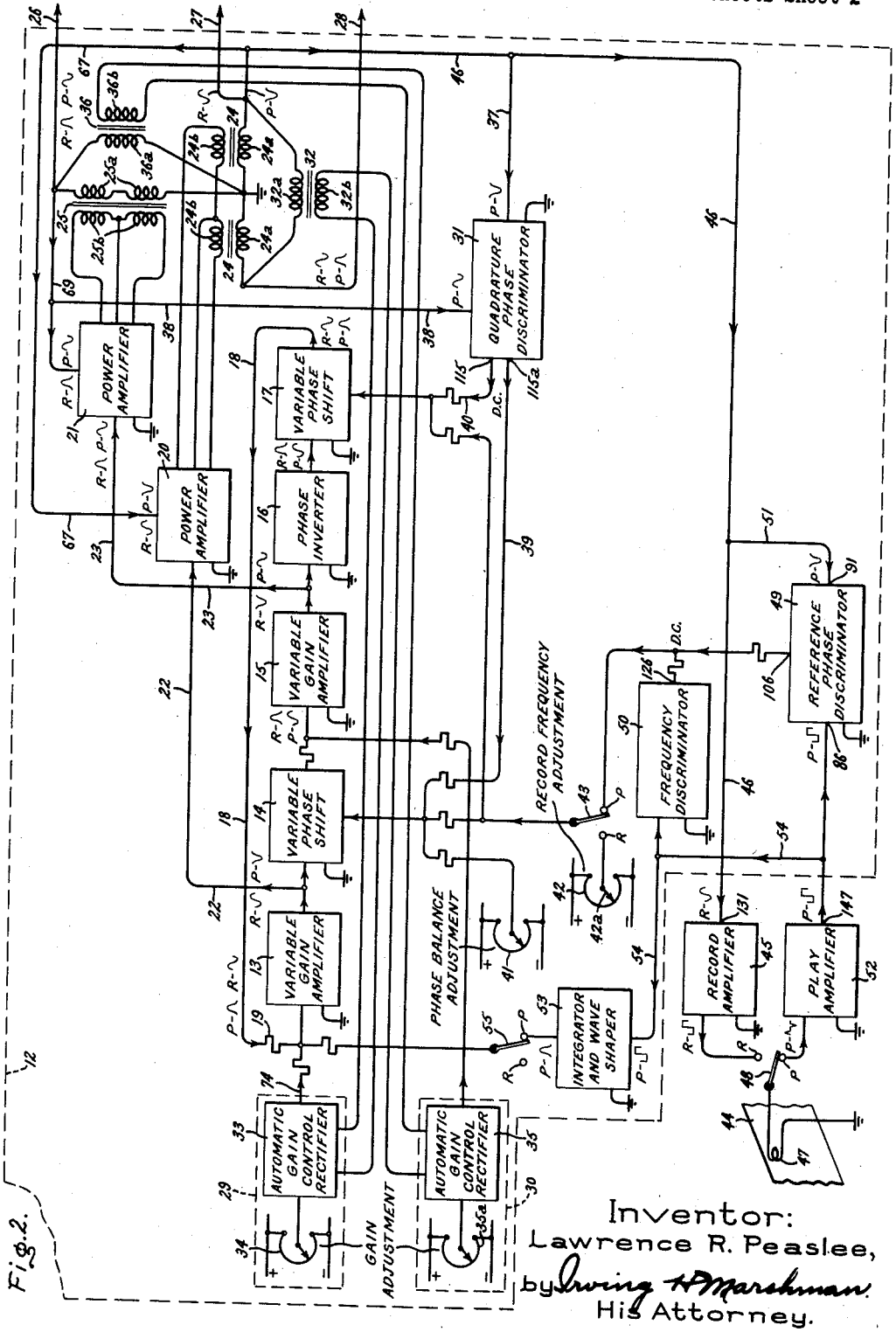

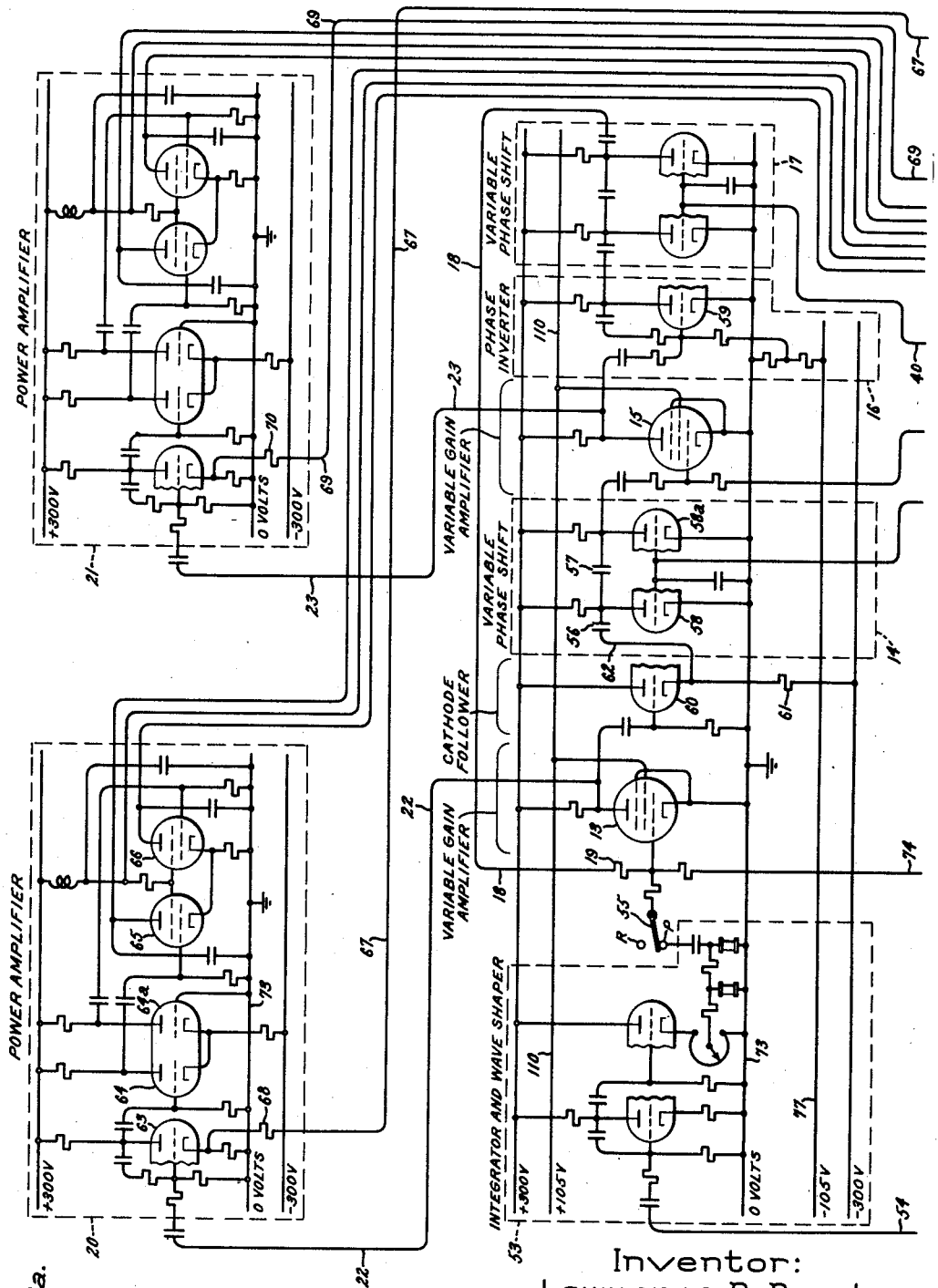

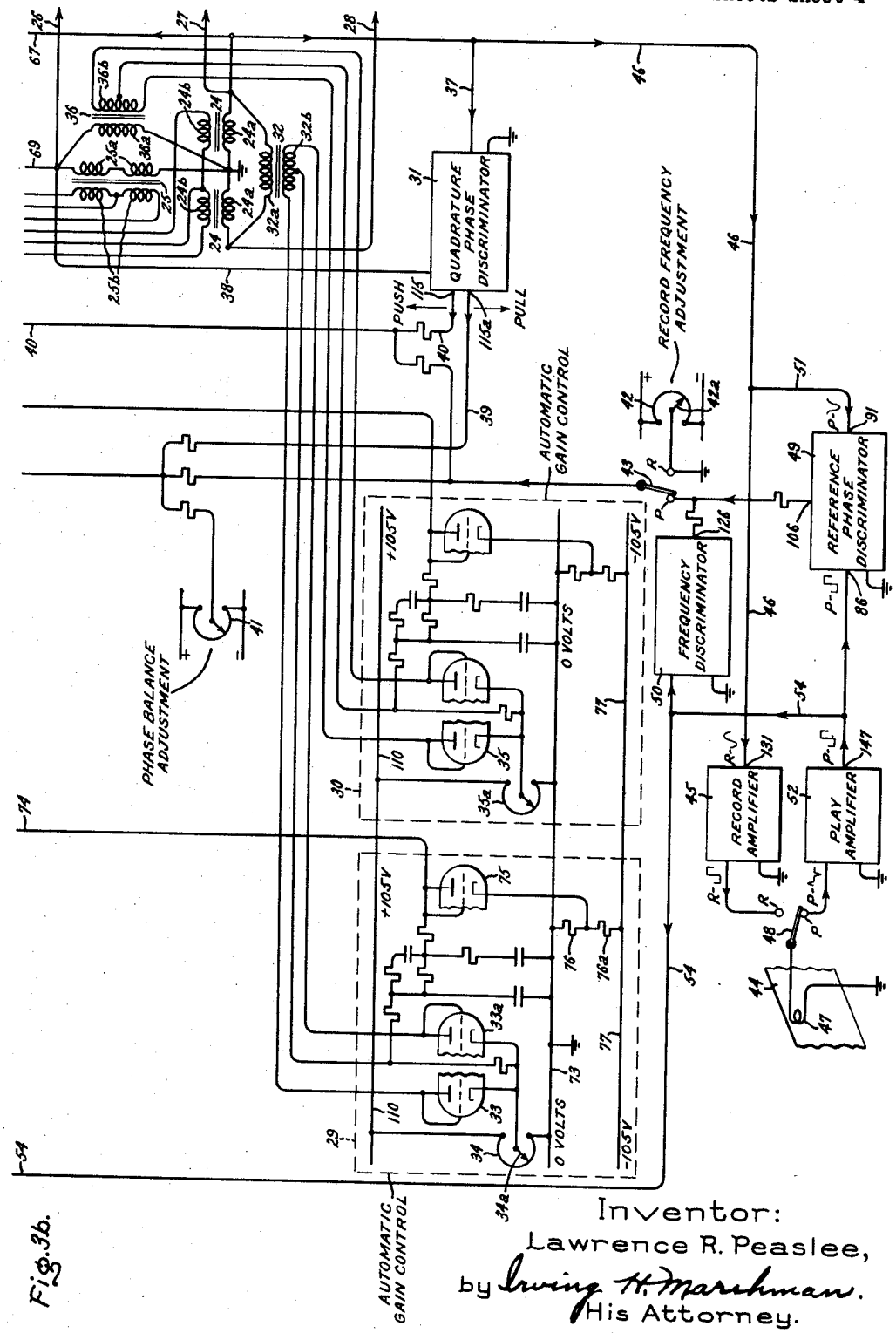

May 17, 1960  L. R. PEASLEE  2,937,365
PROGRAMMING CONTROL SYSTEM
Filed Dec. 28, 1955  9 Sheets-Sheet 5
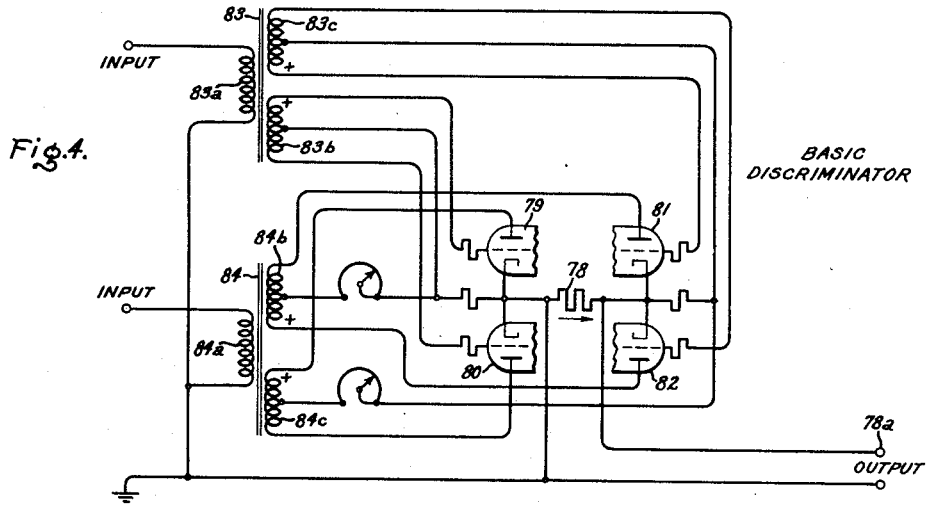
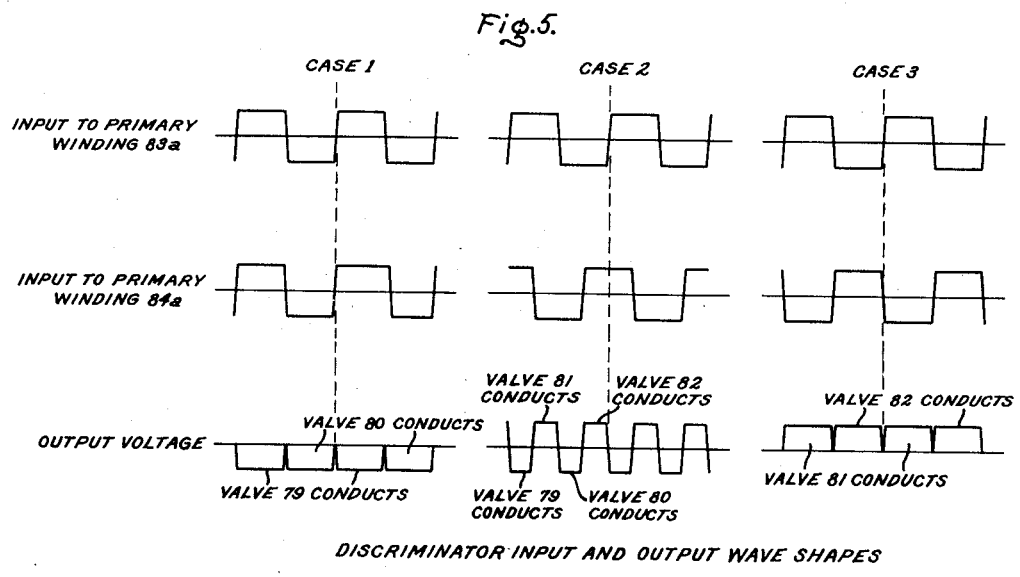
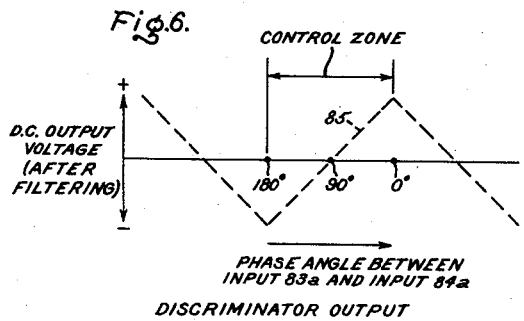
Inventor:
Lawrence R. Peaslee,
by *Irving H. Marchman*,
His Attorney.

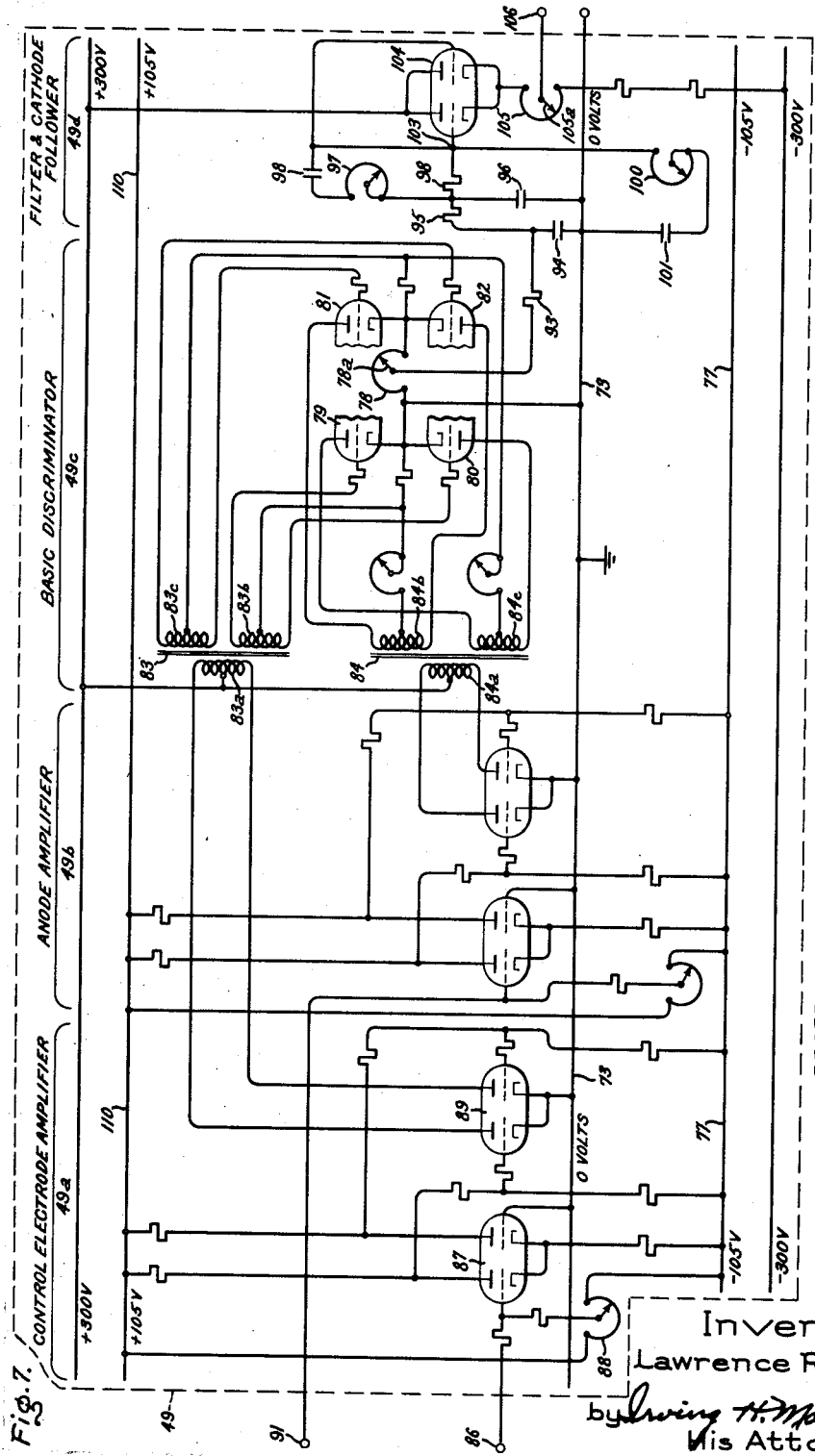

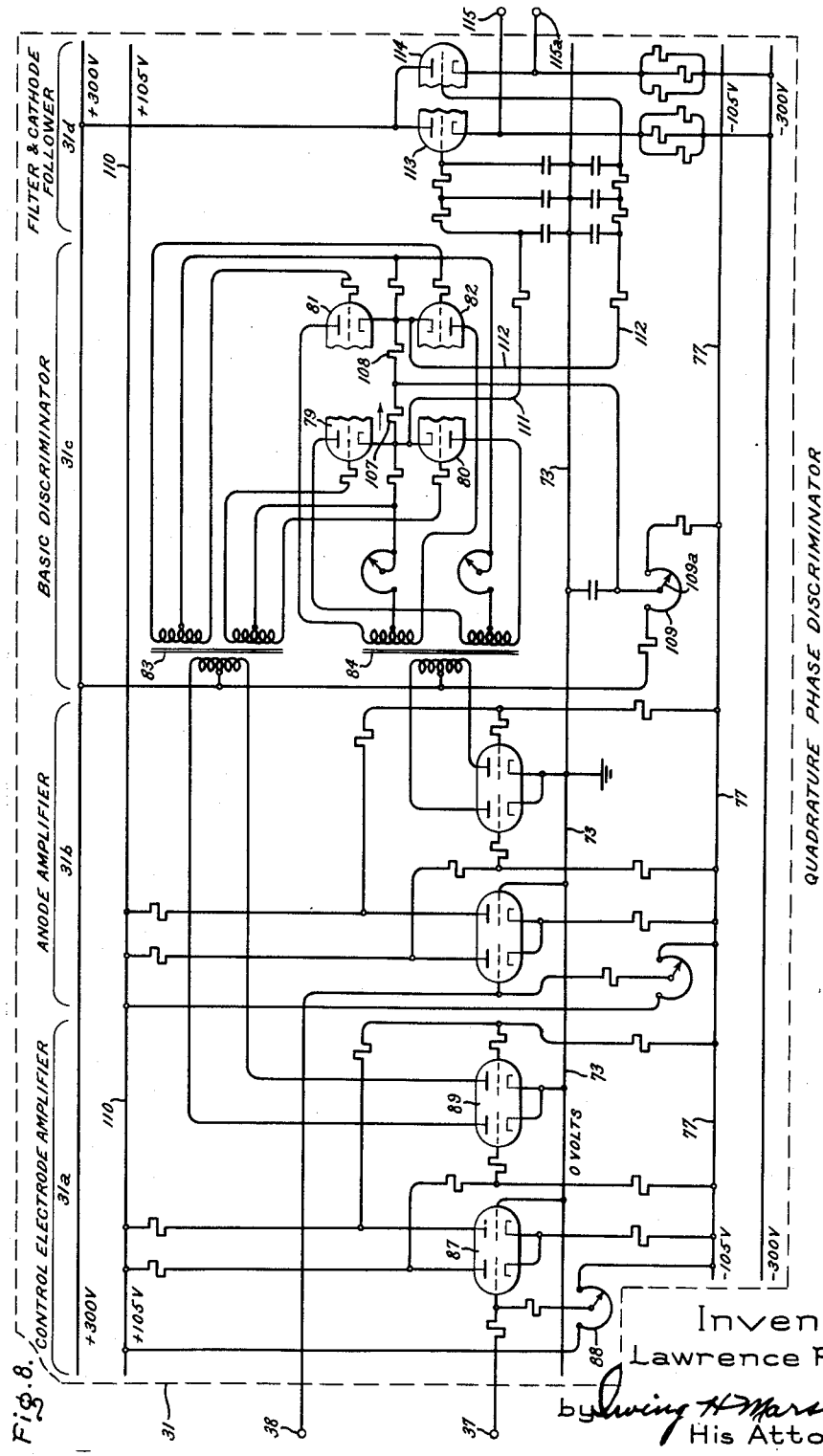

Inventor:
Lawrence R. Peaslee,
by Irving H. Marchman.
His Attorney.

May 17, 1960 L. R. PEASLEE 2,937,365
PROGRAMMING CONTROL SYSTEM
Filed Dec. 28, 1955 9 Sheets-Sheet 9
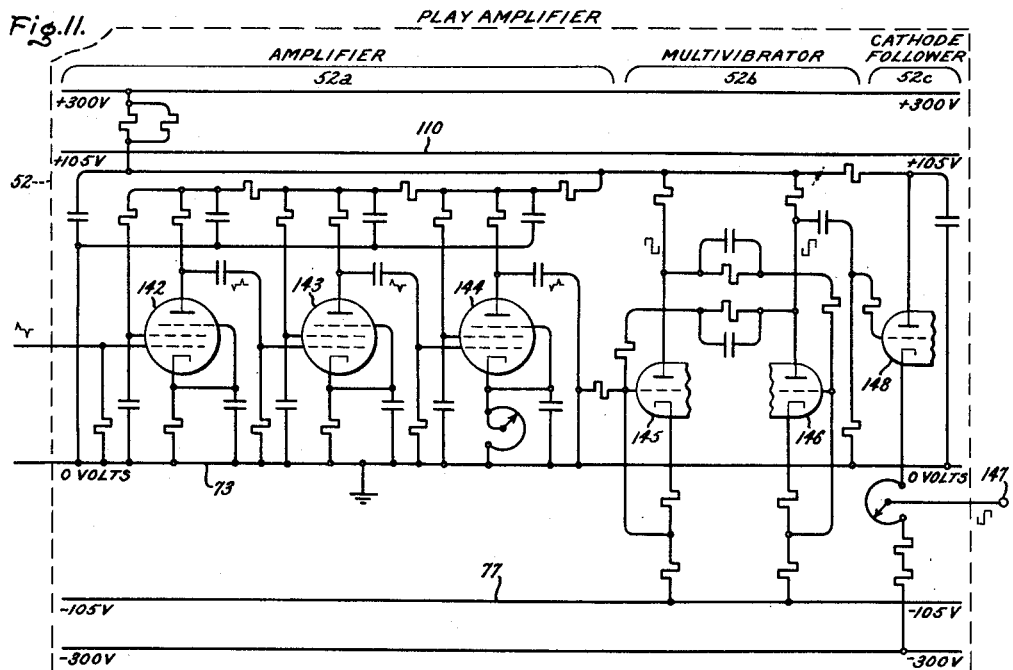
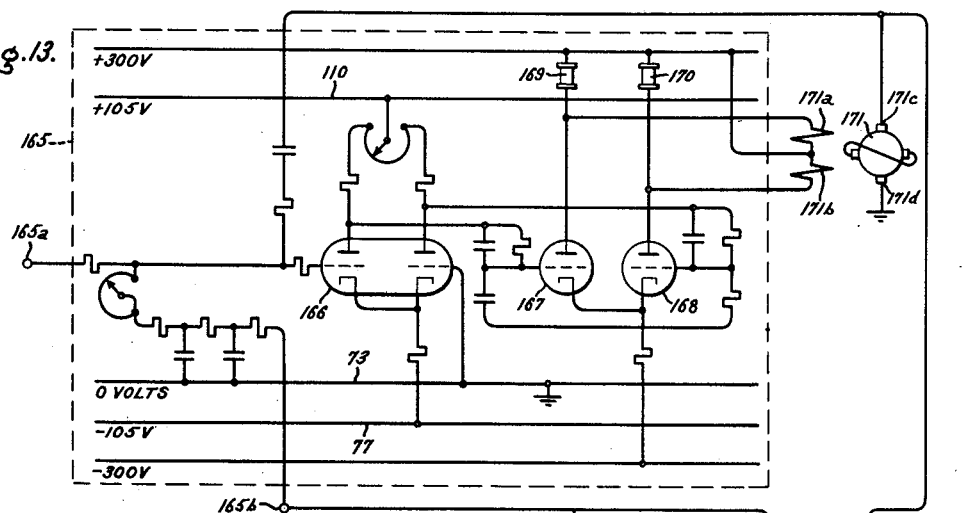
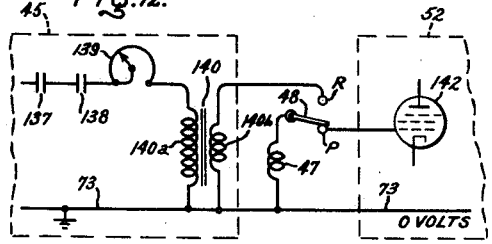
Inventor:
Lawrence R. Peaslee,
by Irving H. Marshman.
His Attorney.

United States Patent Office 2,937,365
Patented May 17, 1960

2,937,365

PROGRAMMING CONTROL SYSTEM

Lawrence R. Peaslee, Waynesboro, Va., assignor to General Electric Company, a corporation of New York Application December 28, 1955, Serial No. 555,967

27 Claims. (Cl. 340—174)

This invention relates to control systems in which control data for a program of sequential operations involving time-motion patterns or other types of automatic cycles is stored in a data storage medium, such as a record, which is subsequently played back to produce automatically a sequence of operations corresponding to the stored data. A general object of this invention is the provision of a simple, reliable and improved programming system of this character.

More particularly, the invention relates to control systems in which the control data for such programed sequence of operation is stored in a data storage medium such as a control alternating pattern of which the phase relationship with respect to a reference control alternating pattern, also stored or recorded in the data storage medium, varies with the instant to instant progress of the program, and it has for a further object a provision of a programming control system of this character which conforms the automatic performance of the program to the stored data with a high degree of fidelity.

A programming control system of this general character as applied to the control of a machine tool is shown in Livingston et al. Patent 2,537,770. In the control system disclosed in this patent, the data storage medium is a multi-channel magnetic tape on which the information or data for programming the controlled machine is recorded and stored in the form of control alternating magnetization patterns of varying phase relationship with respect to a reference control alternating magnetization pattern. The reference control pattern is produced by recording a reference voltage obtained from a suitable source, and the varying phase alternating control patterns are produced by recording alternating control voltages produced by selsyns driven by the controlled elements of the machine.

In the playback operation, the reference pattern produces a reference voltage and the varying phase alternating patterns produce corresponding varying phase control voltages. The phase relationship of these control voltages with respect to the reference voltage is compared with the phase relationship of corresponding voltages produced by the selsyns with respect to the reference voltage. Any difference in this phase relationship from that required to indicate correct position of a controlled element of the machine tool represents an error between the correct position and the actual position of such element. A phase discriminator responds to any such difference in phase to produce an error voltage which is utilized to effect a correction in the position of the controlled element.

During the recording and the playback operation, the selsyns which are driven by the controlled elements are electrically supplied from a device which is known as a selsyn exciter. The accuracy of performance of the selsyn exciter is a vitally important factor in the overall accuracy of the entire programming control system. Accordingly, a further object of this invention is a provision of an improved programming control system of greatly increased overall accuracy embodying an improved selsyn exciter.

In order that the control system may operate with a minimum error, the selsyn exciter is required to produce two equal voltages exactly in quadrature phase relationship with respect to each other, and synchronized with respect to reference voltage. Accordingly, a further object of this invention is the provision of a programming control system in which the selsyn exciter produces two output voltages which are maintained equal in magnitude and are also maintained in quadrature phase relationship with each other and in which means are provided for synchronizing such output voltages with the reference voltage.

In carrying the invention into effect in one form thereof, means are provided for producing an alternating reference voltage from an alternating control pattern stored in a data storage medium of a programming control system together with a selsyn exciter which comprises a phase-shift type oscillator that is synchronized with the reference voltage. Two quadrature related output alternating voltages are derived from the closed loop circuit of the oscillator and means are provided for counteracting deviations of the output voltages from such quadrature relationship.

Another aspect of this invention relates to improvements in the reproduction of signals recorded in the data storage medium. Electrical recording devices possess certain properties which interfere with accurate reproduction of the recorded signal. For example, amplitude of the playback signal may vary as much as plus or minus 30%. Magnetic tape recorders are subject to an undesirable operating characteristic known as "dropout" which causes the playback signal to decrease to a relatively low amplitude for a period of time. The amplitude reduction resulting from dropout may be as much as 30% to 50% for high quality tapes and recorders and as much as 100% for those of lower quality. Accordingly, a further object of this invention is the provision of a programming control system in which errors resulting from amplitude variation and dropout are eliminated.

Toward the attainment of this object the control data for the program is recorded in the storage medium in the form of square wave alternating patterns instead of the sine wave alternating patterns used in the system of the Livingston et al. patent.

Upon playback, a series of pulses is obtained from the square wave alternating pattern in the storage. These are reconverted to square wave alternating voltages and compared in the phase discriminator with square wave voltages converted from sine wave voltages produced by the selsyns which are driven by the controlled elements.

For a better and more complete understanding of the invention, reference should now be had to the following specification and to the accompanying drawings of which Fig. 1 is a schematic block diagram of an embodiment of the invention in a programming control system, Fig. 2 is a schematic block diagram of the selsyn exciter, Figs. 3A and 3B are respective halves of a diagram which when placed end to end constitute a complete elementary diagram of the selsyn exciter with the exception of the discriminators which are illustrated conventionally.

Figure 10:
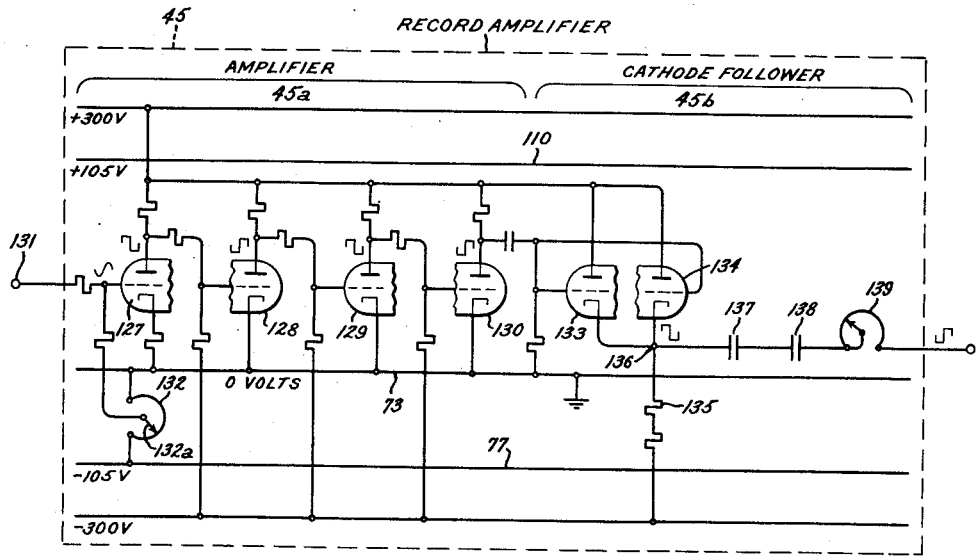

Fig. 4 is an elementary diagram of the basic phase discriminator which is a component of the complete discriminator units employed in the selsyn exciter. Fig. 5 is a chart of characteristic curves illustrating the wave shapes of the input and output voltages of the discriminator, Fig. 6 is a chart of characteristic curves which illustrate the output voltage versus input voltage phase relationship characteristic, Fig. 7 is an elementary diagram of the complete phase discriminator for the reference, longitudinal and cross feed channels of the selsyn exciter, Fig. 8 is an elementary diagram of the quadrature phase discriminator of the selsyn exciter, Fig. 9 is an elementary diagram of the frequency discriminator of the selsyn exciter, Fig. 10 is an elementary diagram of the record amplifier for the reference and motion channels, Fig. 11 is an elementary diagram of the playback amplifier for the reference and motion channels, Fig. 12 is a simple schematic diagram of a simplified switching control for connecting the record and play amplifiers to the record-play coil of the recorder, and Fig. 13 is an elementary diagram of the amplifier for the field circuit of the amplidyne which supplies the motion feed motors.

Referring now to the drawing and particularly to Fig. 1 thereof, a production lathe 1 has a longitudinal lead screw 2 and a cross feed lead screw 3. A workpiece 4 is supported in the usual manner between centers in the headstock and the tailstock and is engaged by a cutting tool 5 which is mounted on a rest on the cross feed slide 6.

The longitudinal leadscrew 2 is driven by suitable driving means which is illustrated as a direct current motor 7. Similarly the cross-feed leadscrew 3 is driven by a suitable driving means which is illustrated as a direct current motor 8.

For the purpose of providing an alternating voltage of which the phase with respect to a reference voltage varies in response to the movement of the carriage 9, a rotary induction device 10 is provided. This device is a selsyn which is physically somewhat similar to a wound rotor induction motor. It has a rotor member which is mechanically coupled to the longitudinal leadscrew 2 and a stator member. A three-phase distributed winding (not shown) is mounted on the stator member and an inductively related single phase winding is mounted on the rotor member. This arrangement may be reversed if desired. The rotor member of a similar rotary induction device 11 is mechanically coupled to the cross-feed leadscrew 3.

During the recording operation, a three-phase alternating voltage is supplied to the three-phase primary windings of selsyns 10 and 11 from a selsyn exciter and amplifier unit 12. In general, the selsyn exciter is an oscillator of the phase-shift type with an output which could be either two phase or three phase depending on whether the selsyns to which it furnishes excitation are two phase or three phase. In the drawings, the selsyns 10 and 11 are illustrated as three-phase devices and consequently the selsyn exciter is illustrated as having a three-phase output. When recordings are being made, the selsyn exciter operates as a free-running oscillator. During the playback, it operates as an oscillator synchronized in frequency and in phase with the signals derived from the data storage medium. As shown in Fig. 2, the selsyn exciter 12 is basically an oscillator of the phase-shift type comprising a closed loop containing a first variable gain amplifier 13, a first variable phase-shift unit 14, a second variable gain amplifier 15, a phase inverter 16 and a second variable phase-shift unit 17. The closed loop is completed from the output of the second variable phase-shift unit to the input of the first variable gain amplifier by means of a conductor connection 18 in which is included a resistor 19. At one particular frequency, the loop phase-shift of the various components is 720 degrees or two complete cycles. Owing to the gain of the two variable gain amplifiers in the loop, the overall gain is greater than the overall losses and therefore the circuit will oscillate. The frequency of oscillation is determined by the combined phase-shift of the two variable phase-shift units since all other phase-shifts in the oscillator loop are essentially constant. The frequency of oscillation is that frequency at which the combined phase-shifts of the variable phase-shift units 14 and 17 is 180 degrees.

In addition to producing amplification, the variable gain amplifiers 13 and 15 operate as phase inverters, i.e. their outputs are 180 degrees out of phase with their inputs. As previously stated, the variable phase-shift units 14 and 17 produce a combined phase-shift of 180 degrees in the loop to which each contributes 90 degrees. Consequently, the output at the variable gain amplifier 13 is 90 degrees displaced from the output of the variable gain amplifier 15. The outputs of the variable gain amplifiers 13 and 15 are fed to the inputs of power amplifiers 20 and 21 respectively to which they are connected by means of output connections 22 and 23 respectively.

This two-phase output from the closed oscillator loop, after amplification by the power amplifiers 20 and 21, is converted into a three phase voltage by means of the Scott-T transformer connection of the secondary windings 24a and 25a of transformers 24 and 25 of which the primary windings 24b and 25b are supplied from the outputs of the power amplifiers 20 and 21 respectively. In order that the voltage at the output terminals 26, 27 and 28 of the Scott-T transformer shall be balanced three phase, it is necessary to maintain the correct relative amplitudes at the output of the two amplifiers and also to maintain these two output voltages in quadrature phase relationship with each other. To accomplish this, automatic gain control circuits 29 and 30 are provided for regulating the magnitude of the output voltages of the power amplifiers 20 and 21, and a quadrature regulator in the form of a quadrature phase discriminator 31 is provided to maintain the 90 degree relationship between the output voltages of the power amplifiers.

To regulate the magnitude of the output voltage of power amplifier 20, the terminal voltage of the secondary winding 24a of output transformer 24 is fed into the primary winding 32a of a transformer 32 of which the voltage of its secondary winding 32b is rectified by means of an automatic gain control rectifier 33 and compared against a reference voltage which is set by means of the gain adjustment potentiometer 34. The voltage at the output of the automatic gain control rectifier 33 which results from this comparison of the output voltage of power amplifier 20 with the direct reference voltage is filtered and mixed with other signal voltages going to the input control circuit of variable gain amplifier 13. It establishes the D.-C. bias for the variable gain amplifier and therefore establishes its gain, which varies with the magnitude of the bias. This D.-C. signal voltage is fed as a negative feedback to the input circuit of the variable gain amplifier. Consequently, a tendency of the gain either of the amplifier 13 or the power amplifier 20 to increase a direct feedback voltage of such polarity as to decrease the combined gain of both amplifiers substantially to its original value.

For the purpose of regulating the output of power amplifier 21, its output voltage is supplied to automatic gain control rectifier 35 by means of a transformer 36 of which the primary winding 36a is supplied from the secondary winding 25a of the power amplifier output transformer and secondary winding 36b is connected to supply the automatic gain control rectifier 35. As in the case of automatic gain control circuit 29, the rectified voltage is compared with a direct reference voltage obtained from the automatic gain control adjustment potentiometer 35a. The D.-C. gain error signal voltage at the output of automatic gain control rectifier 35 is mixed with other signal voltages and establishes the D.-C. level of the bias of the variable gain amplifier 15. Thus, the gain at the output of power amplifier 21 is regulated in a manner similar to that described for the power amplifier 21.

As previously stated, it is necessary to maintain an exact quadrature relationship between the voltages supplied from the power amplifiers 20 and 21 to the Scott connected transformers 24 and 25. To accomplish this, voltages from the secondary windings 24a and 25a are supplied to the two input circuits of the quadrature phase discriminator 31 by means of conductors 37 and 38 respectively. This discriminator has an output which is connected to provide push-pull operation. The push-pull outputs are direct voltages and are both zero volts when the two alternating input voltages are exactly 90 degrees out of phase with each other. When one input voltage leads this 90 degree relationship to the other, one of the direct voltage outputs becomes positive and the other becomes an equal amount negative. When the first input lags the 90 degree relationship to the second, the polarities of the output voltages are reversed. The magnitudes of the direct voltage outputs are substantially proportional to the error in phase relationship i.e. in the departure of the two input voltages from the 90 degree relationship.

One output voltage from the quadrature phase discriminator 31 is mixed with other voltages and applied to the input circuit of the variable phase-shift unit 14 to which it is connected by means of a conductor 39. Similarly, the other is mixed with other voltages and applied to the input circuit of variable phase-shift unit 17 to which it is connected by means of conductor 40. Thus, when the output of the two power amplifiers 20 and 21 are exactly 90 degrees displaced in phase from each other, the quadrature phase discriminator 31 supplies zero direct voltage signals to the input circuits of the two variable phase-shift units. If an error exists, i.e. if the output voltages of the two power amplifiers are not displaced exactly 90 degrees in phase from each other, error voltages exist at the two output connections of the phase discriminator 31 which are proportional to the error in phase, i.e. the departure from the 90 degree relationship, and are of such polarities as to reduce the phase error by increasing the phase-shift of one of the variable phase-shift units and decreasing the phase-shift of the other without disturbing the 720 degree overall phase shift of the oscillator loop. Thus, the phase of the output voltage of power amplifier 21 is maintained accurately 90 degrees displaced in phase from the output voltage of power amplifier 20. A phase balance adjustment potentiometer 41 is provided for the purpose of varying the phase-shift of one of the phase-shift units 14 and 17 with respect to the other for calibration purposes.

The description of the selsyn exciter thus far applies equally well to the record operation of the system or to the play operation. During the record operation the selsyn exciter operates as a free-running oscillator of which the frequency is determined by the constants of the circuit and the setting of the record frequency adjustment potentiometer 42. When connected to the input circuit of both variable phase-shift units 14 and 17 by means of the record play switch 43, its adjustment serves to vary the voltage of both variable phase-shift units simultaneously; thus it varies the frequency at which oscillation occurs without disturbing the 90 degree relationship between the output voltages of the two power amplifiers 20 and 21.

For the purpose of recording in a data storage medium such as a magnetic oxide-coated magnetic tape 44 a reference alternating pattern, an alternating voltage is supplied from the output terminal 27 of the transformer 24 to the input circuit of the reference record amplifier 45 to which the terminal 27 is connected by means of a conductor 46. In the record amplifier this reference voltage is amplified and limited to provide an alternating voltage having a square wave shape and supplied to the reference channel coil 47 of a record playback head which is in inductive relationship with the magnetic tape 44. A record-play switch 48 is provided for connecting the reference record amplifier 45 to the reference coil 47 during the record operation.

For the purpose of synchronizing the oscillator with the reference alternating pattern on the tape or with the reference voltage which is derived therefrom, two discriminators 49 and 50 are provided. The discriminator 49 is the reference channel phase discriminator. It compares the output voltage of the power amplifier 20 with the reference voltage derived from the reference alternating pattern on the magnetic tape and supplies to the input circuit of the two variable phase-shift units 14 and 17 a direct error voltage which is representative of the difference in phase between the output voltage of the power amplifier 20 and the reference voltage. In this connection the output voltage of the power amplifier 20 which is supplied to one input circuit of the reference phase discriminator is obtained from the secondary terminal 27 of transformer 24 to which the input circuit of the discriminator is connected by means of conductors 51 and 46.

The discriminator 50 is a frequency discriminator. During the playback operation, it supplies to the input circuits of the variable phase-shift units 14 and 17 a direct voltage which in magnitude is representative of the magnitude of frequency of the reference voltage which is derived from the reference alternating pattern on the magnetic tape.

An additional force for synchronizing the oscillator with the reference voltage is obtained by supplying to the input of the oscillator either the reference voltage itself or a voltage derived therefrom. For this purpose an amplifier 52, referred to as the play amplifier, is connected to the coil 47 of the record-reproduce head when the record-play switch 48 is operated to the play position. Since the magnetic record reproduce heads produce voltages proportional to the rate of change of the flux, the square wave alternating flux pattern is differentiated to produce voltage pulses; positive voltage pulses occur when the square wave pattern makes a change from negative to positive and negative pulses occur when the square wave pattern changes from positive to negative. These pulses are supplied to the input of the play amplifier 52 in which, by suitable means contained therein such for example a bi-stable multivibrator they are converted into a voltage which appears at the output of the play amplifier as a square wave reference voltage. By means of an integrator and wave shaper 53 an alternating voltage is derived from the square wave reference voltage and converted into a sine wave reference voltage which is supplied to the input circuit of the oscillator. The connection from the input of the integrator and wave shaper to the output of the play amplifier is completed by means of a conductor 54. The sine wave output voltage of the integrator and wave shaper is supplied to the input circuit of the first variable gain amplifier 13 of the oscillator when the record-play switch 55 is operated to the play position.

The circuit and structural details of the component parts of the selsyn exciter are illustrated in Figs. 3A and 3B of the drawing. In the closed loop of the phase-shift oscillator portion of the exciter, the variable gain amplifiers 13 and 15 supply the gain and the variable phase-shift units 14 and 17 effect the phase-shift between the output of amplifier 13 and its input which are necessary to produce oscillations. Although the variable gain amplifiers 13 and 15 may be of any suitable type they are illustrated as pentode electric valves of the 6SK7 type. The variable phase-shift type unit 14 comprises a resistance-reactance network of which the capacitors 56 and 57 constitute the reactance components and the output circuits of variable resistance electric valves 58 and 58a constitute the variable resistance components. These valves 58 and 58a may be of any suitable type; e.g. they may be opposite halves of a 6SN7GT electric valve as illustrated in the drawing. The variable phase-shift unit 17 is identical with the variable phase-shift unit 14.

In the closed oscillator loop, the phase-shift unit 14 precedes the variable gain amplifier 15 and the phase-shift unit 17 precedes the variable gain amplifier 13. In this connection, the loop is completed from the variable phase-shift unit 17 to the input of the variable gain amplifier 13 by means of the conductor 18. This alternate arrangement of amplifiers and phase-shift units is provided so that two signal voltages 90 degrees displaced from each other in phase may be taken from the oscillator loop. As previously described they are taken from the anodes of the two variable gain amplifiers 13 and 15 by means of output connections 22 and 23.

The addition of the second variable gain amplifier valve 15 in the oscillator loop produces an unwanted 180 degrees phase-shift. To compensate for this, the phase inverter 16 is inserted in the loop to produce an additional 180 degrees phase-shift. It is illustrated as comprising a suitable 3-element electric valve 59 such for example as one-half of a 6SN7GT type valve. As shown in the drawing this phase inverter is designed with negative feedback from its anode to its input control electrode so as to establish a gain of approximately unity from the anode of the variable gain amplifier 15 to the anode of the phase inverter.

Between the anode of the variable gain amplifier valve 13 and the variable phase-shift unit 14 a cathode follower is provided for the purpose of providing impedance matching and isolation. It is illustrated as comprising a suitable electric valve 60 such for example as one-half of a 6SN7GT valve. A resistor 61 is included in its cathode circuit and is of such magnitude that the voltage of the cathode closely follows that of the input control electrode. The output of the cathode follower is taken at the cathode by means of conductor 62.

The power amplifiers 20 and 21 are three-stage amplifiers and are identical; consequently a description of only the power amplifier 20 is given. The first stage of amplifier 20 is a three-element electric valve 63 of suitable type such for example as one-half of a 6SN7GT valve. It is provided with negative feedback from its anode to its input control electrode so as to reduce the gain of the first stage, to improve linearity, and to reduce the tendency of the entire amplifier, i.e. all three stages to run into saturation or cutoff when D.-C. level transients are introduced into the amplifier. A second stage of the amplifier comprises two electric valves 64 and 64a which may be both halves of a 6SN7GT valve. These valves 64 and 64a are connected as a phase inverter to produce a push-pull driving control signal for the power amplifier output valves 65 and 66. The negative feedback is supplied around the entire power amplifier 20 by feeding a signal from the secondary winding 24a of the output transformer through conductor 67 and resistor 68 to the cathode of the first stage valve 63. Similarly, negative feedback is supplied from the secondary winding 25a of the output transformer through conductor 69 and resistor 70 to the cathode of the first stage of the second power amplifier 21.

The automatic gain control circuit 29 is provided with a full wave rectifier which comprises two three-element electric valves 33 and 33a which may be and preferably are both halves of a 6SN7GT valve. These valves are supplied from the secondary winding 32b of transformer 32 of which the primary winding 32a is connected across the Scott connected secondary winding 24a of which the primary winding is supplied from the output of power amplifier 20. When the power amplifier develops an output voltage, the centertap of the secondary winding 32b is negative with respect to the slider 34a of the automatic gain control potentiometer 34 of which the voltage between the slider 34a and the ground or zero voltage bus 73 constitutes a direct reference voltage with which the output voltage of power amplifier 20 is compared. Since one of these voltages is positive and the other is negative, the actual output voltage of the automatic gain control circuit 29 is the arithmetical difference of the two voltages. This difference voltage is supplied through a stability network and a conductor 74 to the input control circuit of the variable gain amplifier 13 of which the gain decreases as the voltage supplied to its input circuit becomes more negative. Thus, if for any reason there is an increase in the level of the output voltage of the power amplifier 20, the alternating voltage supplied to automatic gain control rectifier 33 will increase in the negative direction so as to reduce the gain of the variable gain amplifier 13. Since the gain of the power amplifier 20 itself is essentially constant, the voltage at its output will therefore be decreased approximately to its original value. If the direct voltage of the control electrode of the variable gain amplifier 13 becomes more positive than a predetermined negative value its desirable gain characteristic is lost and positive rather than negative feedback results. To eliminate the undesired, improper and unstable operating condition which would result, a diode electric valve 75 is provided for the purpose of limiting the output voltage of the automatic gain control rectifier to such predetermined value which is slightly negative with respect to ground. The diode rectifier 75 may be one-half of a 6SN7GT electric valve with its anode and control electrode connected together to provide diode operation. The anode is connected to the output conductor 74 and the cathode is connected to an intermediate point of a voltage divider comprising resistors 76 and 76a which are connected in series relationship between ground and a negative voltage supply conductor 77 which is assumed to be 105 volts negative with respect to ground. An automatic gain control rectifier 30 is identical with automatic gain control rectifier 29.

As previously pointed out the quadrature phase discriminator 31, the reference phase discriminator 49 and the frequency discriminator 50 which are conventionally illustrated in Fig. 3 are all parts of the complete selsyn exciter system. The basic discriminator circuit which is employed in the quadrature phase discriminator 31 and in the reference phase discriminator 49 is illustrated in Fig. 4 and its operation is illustrated in the chart of characteristic curves of Figs. 5 and 6. This discriminator is similar to the discriminator which is illustrated in Fig. 6 of Patent 2,537,770—Livingston et al. but differs from it in that the entire output voltage signal is developed across a single load resistor 78 instead of being developed across two separate load resistors in series. Another difference results from the character of the input voltage signals which are supplied to the input circuits of the discriminator of Fig. 4 of the present invention in which the two input signal voltages are essentially square waves instead of the sine wave voltages which are supplied to the input circuits of the discriminator of Fig. 6 of the Livingston et al. patent. Actually, the circuit of Fig. 4 will operate equally well with square wave voltage input or sine wave voltage input. However, the output characteristic of direct voltage magnitude versus phase angle between the two input voltages is triangular in shape between square wave input voltages as illustrated in Fig. 6, and sine wave in shape for sine wave voltage input as illustrated in Fig. 10 of the Livingston et al. patent.

In the basic discriminator circuit which is illustrated in Fig. 4, the electric valves 79, 80, 81 and 82 act both as rectifiers and switches. When the two square wave input voltages which are supplied to the primary windings 83a and 84a are in phase electric valves 79 and 80 operate as a full wave rectifier. Polarity markings are indicated by plus signs on the transformer primary and secondary windings. For the inphase condition, the current flow through resistor 78 is from left to right in the direction of the arrow and produces a full wave negative rectified voltage at the output terminal 78a. The wave shapes of the two square wave input voltages and the square wave output voltage for this condition are shown in Case 1 of Fig. 5.

When the two square wave input voltages are 180 degrees out of phase, electric valves 81 and 82 constitute a full wave rectifier and pass current through the resistor 78 in the reverse direction. The two square wave input voltages to the transformer primaries 83a and 84a and the positive full wave output voltage for this condition is shown as Case 3 of Fig. 5.

When the two square wave input voltages to the primary windings 83a and 84a are 90 degrees out of phase with each other, each of the four electric valves 79, 80, 81 and 82 conducts for one-fourth cycle thereby producing at the output terminals a square wave voltage of double the fundamental frequency. This is illustrated in Case 2 of Fig. 5. As shown by the wave shape of the square wave output voltage, the area under the positive portions of the wave are equal to those under the negative portions. The result is that an average direct voltage of zero volts is produced at the output terminals. Of course, considerable ripple is present at the output terminals which must be filtered out. Thus, it is seen that for a 90 degree displacement between the square wave input voltages, the output voltage is zero. For phase angles between inphase and 90 degrees out of phase, i.e. between Case 1 and Case 2, the output voltage will vary from zero to maximum in the negative direction, substantially proportionally to the phase displacement between the two input voltages from the 90 degree initial balanced condition of Case 2. Correspondingly, for phase displacements between 90 degrees out of phase and 180 degrees out of phase, i.e. between Case 2 and Case 3 the output voltage will be positive and essentially proportional to the phase displacement between the two input voltages from the 90 degree initial balance condition of Case 2. The relationship between the magnitude and polarity in the output voltage and the phase relationships of the input voltages to the transformer primaries 83a and 84a is represented in Fig. 6 by the triangular shaped curve 85 in which ordinates above the zero axis represent positive voltage, ordinates below the zero axis represents negative voltage and abscissae represents the phase relationship between the input voltages.

The circuit details of the complete reference phase discriminator 49 are shown in Fig. 7. It comprises four sections, e.g. the control electrode voltage amplifier 49a, the anode voltage amplifier 49b, the basic discriminator 49c and the filter and cathode follower 49d. In this connection the basic discriminator is essentially the same as the basic discriminator of Fig. 4. One of the input voltages which may be assumed to be the square wave reference voltage is supplied from the output terminal of the play amplifier 52 of Fig. 3 to the input terminal 86 of the control electrode voltage amplifier section 49a. This input voltage is supplied to the control electrode of the first stage valve 87 which is illustrated as comprising both halves of a 6SN7GT valve. This valve is connected as an overdriven phase inverter and has a pushpull output. The valve is sufficiently overdriven to result in the major portion of the top and bottom of the sine wave output voltage being clipped off by saturation and cutoff characteristics. Thus the pushpull output which is taken at the anodes of the valve is essentially a square wave voltage. The control electrode bias potentiometer 88 serves to adjust the negative bias of the input section of the valve so as to provide balancing between the top and bottom halves of the square wave output voltage. The pushpull output voltages at the anodes of the valve 87 are then fed to the control electrodes of an amplifier stage which is illustrated as an electric valve 89 which, like the valve 87 preferably comprises both halves of a 6SN7GT twin triode electric valve. This amplifier valve 89 supplies the output square wave voltage to the primary winding 83a of the control electrode transformer 83 of which the secondary windings 83b and 83c supply the amplified square wave voltages to the control electrodes of the valves 79, 80, 81 and 82 of the basic discriminator circuit which, as pointed out in the foregoing is essentially the same as the basic discriminator circuit of Fig. 4.

The second input voltage which is assumed to be the voltage derived from the terminal 27 of the secondary winding of the output transformer of power amplifier 20 is supplied through conductors 46 and 51 to the input terminal 91 of the anode voltage amplifier section 49b which is identical with the control electrode voltage amplifier section 49a just described. The output voltage of the amplifier stage of this section is supplied to the primary winding 84a of a transformer 84 of which the secondary windings 84b and 84c which supply the anodes of the electric valves 79, 80, 81 and 82 of the basic discriminator circuit.

The output circuit load resistor 78 of the discriminator circuit is illustrated as a potentiometer which is made adjustable for the purpose of adjusting the gain. From the left hand terminal of the output circuit load resistor 78 and the slider 78a, the discriminator output voltage at the selected gain level is supplied to a two-stage filter comprising resistor 93, capacitor 94, resistor 95 and capacitor 96. After filtering, the signal voltage is supplied through a lag-lead stability network to provide stabilization for regulating the phase of the oscillator voltage with respect to the reference voltage derived from the alternating reference pattern on the magnetic tape, i.e. for synchronizing the oscillator with the reference voltage. The components making up the lag-lead network are potentiometer 97, capacitor 98, resistor 99, potentiometer 100, capacitor 101.

In order to provide load isolation and impedance matching, the voltage at the output terminal 103 of the lag-lead network is fed to a cathode follower valve 104 which is illustrated as comprising both halves of a twin triode 6SN7GT electric valve. Constituting a portion of the cathode resistor of the cathode follower is a rheostat 105 having a sliding contact 105a which is connected to the output terminal 106. As shown in Figs. 2 and 3 when the switch 43 is operated to play position, the output terminal of the reference phase discriminator 49 is connected to the input control circuits of the variable resistance valves 58 and 58a which constitute the resistance components of the variable phase-shift units 14 and 17.

Similar to the reference phase discriminator, the quadrature phase discriminator 31, as shown in Fig. 8, has a control electrode voltage amplifier section 31a and anode voltage amplifier section 31b, a basic discriminator section 31c and a filter and cathode follower output section 31d. The control electrode voltage amplifier section 31a and the anode voltage section 31b supply square wave voltages to the basic discriminator circuit in a manner identical to that described in connection with the reference phase discriminator. The basic discriminator section is similar to the basic discriminator section of the reference phase discriminator but differs from it in that it has two series load resistors 107 and 108 instead of a single load resistor. In addition, the centertap between these two load resistors 107 and 108 is connected to the slider 109a of a balance control potentiometer 109 which is connected to a suitable source direct voltage such as represented by a supply conductor 110 of which the voltage is assumed to be 105 volts positive with respect to ground and supply conductor 77 of which the voltage is assumed to be 105 volts negative with respect to ground. This provides a double-ended or pushpull output at conductors 111 and 112. When the discriminator output is zero, the voltage with respect to ground at both of these output conductors is zero. Whenever one becomes positive the other becomes negative by an equal amount and when either becomes negative the other becomes positive by an equal amount. These two outputs are filtered and supplied to the separate cathode followers 113 and 114 respectively. The pushpull output terminals 115 and 115a of the cathode follower are connected by means of conductors 40 and 39 respectively to the input control circuits of the variable resistance electric valves 58a which constitute the variable resistance elements of the variable phase-shift units 14 and 17 as illustrated in Figs. 2 and 3.

The circuit and structural details of the frequency discriminator 50 is illustrated in Fig. 9. As shown, it has four sections, i.e. an amplifier and differentiating amplifier section 50, full wave rectifier section 50b, a cathode follower and filter section 50c and an output amplifier section 50d. Since the frequency discriminator 50 is supplied from the reference channel play amplifier 52, the incoming voltage which is supplied to the input circuit of electric valve 116 of the amplifier of the differentiating amplifier section 50a is a square wave voltage having very steep wave fronts. The electric valve 116 is connected as a cathode follower to provide impedance matching and isolation. It may be of any suitable type of valve such for example as a 6SN7GT valve. Capacitor 117 and resistor 118 constitute a differentiating circuit with a short time constant. As a result of differentiation, the square wave voltage input of amplifier valve 116 is converted into a series of positive and negative pulses. The positive pulses occur when the square wave voltage rises from maximum negative to maximum positive and conversely the negative pulses occur when the square wave decreases from maximum positive to maximum negative. Since the amplitude of the square input voltage and the time constant of the differentiating circuit are both constant, the pulses are all identical in size and shape.

The voltage pulses produced by the differentiating circuit are supplied to the input circuit of a phase inverter and amplifier valve 119 which is illustrated as comprising both halves of a twin triode 6SN7GT valve. The two halves of phase inverter valve 119 are connected to provide a push-pull output which is taken at the anodes. This push-pull output voltage is supplied to a full wave rectifier valve 120 of which the output voltage is developed across a potentiometer 121. Owing to the connection of the potentiometer in the anode circuit of the rectifier, the output consists only of negative pulses. There is one negative pulse for each positive pulse and one for each negative pulse fed into the input circuit of the phase-inverter valve 119. The rectified negative pulse output of the full wave rectifier is then supplied to a cathode follower electric valve 122 of which the control electrode is connected to the slider 121a of the potentiometer 121. The output voltage of the cathode follower valve is taken at the cathode, and is filtered in a three-stage filter 123. The output voltage which appears at the terminal 123a of the filter is proportional to the number of pulses per second which, of course, is proportional to the frequency of the square wave input voltage which is supplied to the input circuit of amplifier valve 116. The direct voltage proportional to frequency which appears at terminal 123a is supplied to the output circuit of the phase-inverter valve 124 of which the output is supplied to the input circuit of cathode follower valve 125. The output of the cathode follower is taken at the cathode and the output voltage is supplied to the output terminals which are illustrated as comprising a terminal 126 and the zero or ground voltage conductor 73. When the record-play switch 43, which is seen in Figs. 2, 3 and 4, is in record position, the output terminal 126 of the frequency discriminator is connected to the input control circuit of the variable resistance valves 58 and 58a which constitute the variable resistance components of the variable phase-shift units 14 and 17.

As shown in Fig. 10, the record amplifier 45 for the reference channel is composed of an amplifier section 45a and a cathode follower section 45b. The amplifier section comprises four triode electric valves 127, 128, 129 and 130 which are connected to provide four stages of direct coupled amplification. To the input terminal 131 of the first stage amplifier valve 127 is supplied a sine wave voltage which is derived from the terminal 27 of the secondary winding 24a of the Scott-connected transformer. The four stages 127, 128, 129 and 130 amplify and limit the sine wave voltage so as to produce a square wave voltage. A balance control potentiometer 132 is connected across the zero voltage and minus 105 voltage supply conductors 73 and 77. Its slider 132a is connected to the input control electrode of the first stage 127. Adjustment of the slider serves to adjust the bias of the first stage valve thereby to adjust the positive and negative portions of the amplified square wave voltage to make them equal in time duration. The square wave voltage which appears at the output of the fourth stage amplifier valve 130 is supplied to the cathode follower section 45b which comprises two electric valves 133 and 134 and a resistor 135 in the cathode circuit. The output of the cathode follower section 45b is taken at the cathode terminal 136 from which the output voltage is supplied through capacitors 137 and 138 and the record current control potentiometer 139 to the primary winding 140a of the record transformer 140 as illustrated in Fig. 12. When the record-play switch 48 is operated to its record position, the secondary winding 140b of the record transformer is connected to the recording head coil 47. Capacitors 137 and 138 prevent any direct voltage component from reaching the transformer 140, and the record current potentiometer 139 adjusts the volume of the record current in the coil 47 of the record-play head.

The reference channel play amplifier 52 which is illustrated in detail in Fig. 11 comprises three sections of which the first section 52a is a three-stage amplifier, the second section 52b is a multivibrator and the third section 52c is a cathode follower. The amplifier section comprises electric valves 142, 143 and 144. These valves may be of any suitable type such for example as 6SJ6 valves, which provide high gain amplification. The rather small pulse voltage signals from the record-play head of the tape recorder during playback are amplified by the three high gain amplifier stages to the input circuit of the first stage of which the record-play coil 47 of the record-playback head is connected. When the record-play switch 47 is in its play position, the rather small pulse voltage signals from the record playhead are amplified by the high gain three stage amplifier section. The amplified voltage pulses which appear at the anode terminal of the output stage of the amplifier are supplied to the input control circuit of the first stage valve 145 of the bi-stable multivibrator 52b of which the second stage is an electric valve 146. These valves 145 and 146 are connected in an Eccles-Jordon flip-flop circuit. When a positive pulse reaches the control electrode of the first stage valve 145 of the multivibrator, the voltage of the anode of the second stage valve 146 changes suddenly to a more positive value and remains at such more positive value until a negative pulse is received at the control electrode of the first stage valve 145. At this time, the voltage of the anode of the second stage valve 146 suddenly swings negative and remains negative until the next positive voltage pulse arrives at the control electrode of the first stage valve 145. Thus, the output at the anode of the second stage valve 146 is a square wave voltage. This voltage is fed through the cathode follower stage 52c to the output terminal 147. Preferably the cathode follower stage comprises a 6SN7GT triode electric valve 148 in the cathode circuit of which are connected suitable cathode resistors. As shown in Figs. 1, 2 and 3 the output terminal 147 of the cathode follower section is connected to the input of the selsyn exciter 12 and particularly to the input circuit of the reference phase discriminator 49, the frequency discriminator 50, and the integrator and wave shaper 53.

As shown in Fig. 1, the single phase secondary winding of the longitudinal motion control selsyn 10 is connected through a conductor 149 and the contacts of a record-play switch 150, when operated to its record position, to the input control circuit of the longitudinal control channel record amplifier 151 which is in all respects identical with the reference channel record amplifier 45 which is disclosed in Fig. 10. In the record amplifier 151, the sine wave voltage which is supplied from the longitudinal motion selsyn 10 is converted to a square wave alternating voltage which, when the record-play switch 153 is in its record position, is supplied through the output conductor 152 to the recording head coil 154 which causes the square wave output voltage of the record amplifier 151 to be recorded on the tape.

Similarly, the single-phase secondary winding of the cross-feed motion control selsyn 11 is connected through a conductor 155 and contacts of a record-play switch 156 to the input control circuit of the cross-feed record amplifier 157, which is in all respects identical with the record amplifier 45 for the reference channel and the record amplifier 151 for the longitudinal motion control channel which is disclosed in Fig. 10. In the record amplifier 157 the sine wave voltage which is supplied from the secondary winding of the selsyn 11 is converted into a square wave voltage and supplied through the output conductor 158 and record-play switch 159 to the record-playback head coil 160 which causes the square wave voltage output of the record amplifier 157 to be recorded on the tape as an alternating square wave control pattern.

During the playback operation, the phase of the voltage reproduced by the longitudinal motion record-playback head coil 154 is compared with the phase of the secondary voltage of the selsyn 10 which is driven by the longitudinal motion lead screw 2 and any difference in the phase relationship of the two voltages from that required to indicate correct position of the tool on the longitudinal motion leadscrews 2 is utilized to control the direct current motor 7 which drives the leadscrew.

To detect such difference in phase relationship of these two voltages, a phase discriminator 161 is provided. This discriminator 161 is in all respects identical with the reference phase discriminator 49 illustrated in Fig. 7. Like the reference phase discriminator 49, the longitudinal phase discriminator 161 has two inputs 161a and 161b and an output terminal 161c. (See Fig. 1.) When the record-play switch 150 is in the play position, the input 161a is connected through the conductor 149 to the single phase winding of the longitudinal motion selsyn 10. The second input 161b is directly connected at all times to the output terminal 163a of the longitudinal motion play amplifier 163. The output terminal 161c of phase discriminator 161 is connected through the contacts of the record-play switch 164 in the play position to the input circuit of an amplidyne field amplifier 165. The output voltage of the longitudinal phase discriminator 161 which is supplied is representative of the phase relationship between the two voltages supplied to the input terminals 161a and 161b and is represented graphically in Fig. 6 of the drawing by the curve 85.

Although the amplidyne field amplifier 165 may be of any suitable type it is preferably of the type which is illustrated in Fig. 13 of the drawing. It is shown as comprising a two-stage amplifier of which the first stage comprises a twin triode electric valve 166 with cathode coupling between the two sections of the valve and the second stage comprises two triode electric valves 167 and 168, also provided with cathode coupling between the two valves. Non-linear resistors 169 and 170 are connected in the anode circuits of the valves 167 and 168 and the voltage across each of these resistors constitutes the output voltage for the corresponding valve. These output voltages are supplied to the control field windings 171a and 171b of a suitable dynamoelectric machine amplifier, such as the amplidyne 171. The amplidyne field amplifier 165 is provided with a second input terminal 165b to which is supplied a feedback voltage which is proportional to the speed of the longitudinal drive motor 7. This feedback voltage is obtained from a tachometer generator 172 which is driven by the motor 7 and to one armature terminal of which the input terminal 165b of the amplifier is connected by means of conductor 172a. The two voltages which are supplied to the input terminals 165a and 165b are compared with each other in a comparison network and the difference or error voltage is supplied to the input circuit of the first stage valve 166. The output or load axis brushes 171c and 171d of amplidyne 171 are connected to the armature of the longitudinal feed motor 7.

The various grid biases of the amplidyne amplifier 165 are chosen so that with zero output voltage from the phase discriminator 161 supplied to the input terminal 165a, the two second stage valves 167 and 168 will be conducting approximately equal values of current in approximately mid range. Consequently, the control field windings 171a and 171c of the amplidyne will be equally and oppositely energized; the net excitation of the machine will be zero and the load axis brush voltage will be zero and the motor 7 will be at standstill. When the voltage supplied to the input of the first stage valve is maximum and positive, the current supplied to the control field winding 171a will be increased to a maximum and the current supplied to the control field winding 171b will be correspondingly decreased thereby to produce a maximum net excitation of the amplidyne and a maximum output voltage which may be assumed to be positive at the load brush 171c, thereby causing the motor 7 to operate at maximum speed in one direction. Similarly when the voltage supplied to the input of the first stage valve is maximum and negative the voltage at the load axis brushes of the amplidyne will be maximum but of reverse polarity, and the motor 7 will rotate at maximum speed in the reverse direction.

The longitudinal motion channel play amplifier 163 is in all respects identical with the previously described reference channel play amplifier 52 which is shown in Fig. 11 and consequently a repetition of the description is omitted.

A phase discriminator 173, which is in all respects identical with the reference phase discriminator 49 shown in Fig. 7 and which is also identical with the longitudinal motion phase discriminator 161 is provided for producing a direct control voltage during playback in response to errors in the phase between the voltage induced in the secondary single phase winding of selsyn 11 and the voltage induced in the recording and playback head coil 160. This control voltage is amplified by means of an amplidyne field amplifier 174 which is in all respects identical with the amplidyne field amplifier 165. From the output circuit of amplifier 174 voltages are supplied to the control field windings 175a and 175b of an amplidyne 175. The load axis brush voltage of amplidyne 175 is supplied to the D.-C. motor 8 which drives the cross-feed leadscrew 3; consequently, the amplidyne 175 is known as the cross-feed amplifier and the amplidyne field amplifier 174 is known as the cross-feed motion amplidyne field amplifier.

For the purpose of controlling the operation of the machine tool by hand, a manual speed controller 176 is provided for the purpose of controlling the speed and direction of rotation of the longitudinal speed drive motor 7. It comprises a potentiometer connected across suitable positive and negative supply conductors and having a slider 176a which when the record-play switch 164 is in the record position, is connected to the input terminal 162a of the longitudinal motion amplidyne field amplifier 162. A similar manual speed controller 177 is provided for controlling the speed and direction of rotation of the cross-feed drive motor 8.

The magnetic recorder is similar in principle to those widely used in the radio broadcast and entertainment fields. The multiple channel magnetic oxide coated tape 44 is wound upon a storage or unwinding reel 178. Its outer end is threaded through the recording and playback head and attached to the drum of the winding-up reel 179. The windup-up reel is driven by suitable driving means, such as an electric motor (not shown) and tension is maintained in the tape by means of an electric motor coupled to the unwinding reel 178 and thereby driven as a generator to provide regenerative braking. Usually a capstan is mounted between the take-up reel and the recording head and the tape passes between the drum of the capstan and a pinch roll. The capstan is driven at a speed, which is usually substantially constant, by suitable driving means, such as an induction motor (not shown). The driving motors and controls for the reels and capstan constitute no part of the present invention and consequently, they, together with their controls are omitted from the drawing in the interest of simplicity. It is sufficient for the purposes of the invention to understand that during the recording and playback operations the tape is drawn past the recording head at substantially constant speed. Between the two operations, the tape is rewound on the storage reel 178.

It is usually necessary to have some means of adjusting the position of each motion on playback to compensate for fixed phase errors in the complete system and to permit adjusting for different machine setups between record and play. For example, in a machine tool application, the workpiece may not be located in the exact position on the table for playback that it occupied during the record operation, or the location of workpieces for successive repeat operations may not occupy the same positions. To provide the necessary adjustment to compensate for these discrepancies, a differential selsyn is connected in series with the three supply conductors between the selsyn exciter 12 and each of the motor selsyns. As shown, in Fig. 1 a differential selsyn generator 180 is connected between the three-phase supply conductors 181, 182 and 183 and the distributed three-phase winding of the cross-feed motion selsyn 11. The conductors 181, 182 and 183 are connected to the output terminals 26, 27 and 28 of the selsyn exciter 12. A similar selsyn 184 is connected between the conductors 181, 182 and 183 and the distributed three phase winding of the longitudinal motion selsyn 10. By rotation of the rotors of the differential selsyns 180 and 184 with respect to their stator windings, the phase of the three phase voltages which are supplied to the distributed three phase primary windings of the motion selsyns 10 and 11 may be advanced or retarded by an amount proportional to the amount of such rotation.

With the foregoing understanding of the elements and their organization in the complete system, the operation of the system itself and of the component parts will readily be understood from the following detailed description.

In operation, the operator mounts his stock workpiece 4 in the lathe and operates all record playback switches to the record position. In this connection, although the various record-playback switches in the system are illustrated as separate devices, they may be ganged so that all may be operated simultaneously in response to the energization of a single operating solenoid.

The tool is positioned to a known zero point or reference point. This is usually accomplished with the assistance of the usual micrometer dials with which the machine tool is provided. The movement of the tool to the zero point is effected by using the speed controlled potentiometers 176 and 177.

Once the tool is located at the zero point, the recorder is turned on and the magnetic tape begins to move past the record and playback head coils 47, 154 and 160. In this connection it will be recalled that the coil 47 is associated with the reference channel of the tape, the coil 154 is associated with the longitudinal motion channel and the coil 160 is associated with the cross-feed motion channel. The selsyn exciter operates as a free-running operating oscillator supplying three wire, three phase sine wave voltages to the distributed three phase primary windings of the longitudinal and cross-feed motion selsyns 10 and 11 respectively. The frequency of oscillation may be adjusted to any suitable value by adjustment of the frequency control potentiometer 42. A frequency of 200 cycles provides satisfactory operating characteristics. Simultaneously, a since wave voltage is supplied from the terminal 27 of the selsyn exciter to the reference channel record amplifier which amplifies and limits the voltage to produce and supply a square wave voltage to the reference channel record playback coil 47 which, in turn, causes the square wave voltage to be recorded in the reference channel as a reference square wave alternating control pattern.

The phase at any instant of the single phase voltage induced in the rotor winding of the cross-feed selsyn 11 with respect to the reference alternating pattern which is being recorded on the tape represents the position at such instant of the tool on the cross-feed axis. This single phase rotor voltage is supplied through conductor 155 and contacts of the record switch 156 to the record amplifier 157 in which it is amplified and limited so as to produce a square wave alternating voltage which is supplied to the coil 154 of the record playhead to cause to be recorded in the cross-feed channel of the tape an alternating control pattern. Thus there is recorded in the cross-feed channel an alternating pattern of which the instant to instant phase with respect to the reference alternating pattern represents the instant to insant position of the tool along the cross-feed leadscrew.

In a similar manner, position signal voltages from the longitudinal feed selsyn 10 are supplied through conductor 149 to the longitudinal channel record amplifier 151 in which it is converted into a square wave alternating voltage and supplied to the coil 154 of the record playhead to cause to be recorded in the longitudinal control channel a control square wave alternating pattern of which its instant to instant phase with respect to the reference pattern represents the corresponding instant to instant position of the tool along the longitudinal axis.

The workpiece may now be turned to the desired shape by manipulating the potentiometers 176 and 177 of the master control station as explained in the foregoing. Alternatively, on automatic contouring control systems such as disclosed in Patent 2,492,731—Branson may be utilized to follow the outline of a pattern and control the motors 7 and 8 to drive the selsyns 10 and 11 to cause to be recorded in the motion channels of the tape alternating control patterns of which the phase with respect to the reference alternating pattern represents the desired instant to instant positions of the tool on the longitudinal and cross-feed leadscrews 2 and 3 during playback.

Thus, while the work is being continuously machined or, in some suitable manner the selsyns 10 and 11 are being driven, the longitudinal and cross-feed positions are being recorded simultaneously with the reference voltage signal.

If the longitudinal feed is stationary, the phase of the signal voltage recorded on the tape by the coil 154 will not change with respect to the reference voltage signal recorded on the tape by the coil 47. This constant relationship of the phase of the recorded longitudinal feed signal voltage and the recorded reference signal voltage continues as long as the longitudinal feed is stationary. If, during a succeeding instant of time, the longitudinal feed moves a predetermined amount, the rotor of the selsyn 10 is rotated a corresponding amount and consequently the phase of the voltage induced in its single phase rotor winding is advanced or retarded, depending upon the direction of the rotation. As the movement of the longitudinal feed continues, the phase of the voltage signal which is recorded varies from instant to instant so that there is recorded on the tape an alternating pattern of varying phase relationship between a reference alternating pattern and a signal alternating pattern which represents the position of the tool from instant to instant on the axis of the longitudinal feed. Similarly, as the position of the tool changes along the axis of the cross-feed, the phase of the voltage induced in the rotor winding of the cross-feed selsyn 11 is advanced or retarded, depending on the direction of the movement of the tool on the cross-feed leadscrew. As the cross-feed motion continues, the phase of the cross-feed alternating pattern which is recorded on the tape varies with respect the reference alternating pattern which is being recorded on the tape so that there is recorded thereon a pattern of varying phase relationships between a reference alternating pattern and a signal alternating pattern of which the instant to instant phase relationship represents the instant to instant position of the tool on the cross-feed leadscrew.

When the machining operation is completed, the tool is returned to the zero position in which it was located at the beginning of the recorded program of operations. The tape 44 is rewound on the storage reel 178 and the record-play switches are moved from the record positions to the play positions. If a workpiece was in the lathe during the recording operation it is replaced by a fresh piece of stock and the recorder is turned on and the tape is again drawn from the storage reel 178 past the record and playback head and wound up upon the take-up reel 179. Since the magnetic record playback heads produce voltages proportional to the rate of change of flux, square waves of flux pattern on the tape are differentiated and are reproduced as pulses. Positive pulses occur where the square wave makes a change from negative to positive and negative pulses occur when the square wave makes a sudden change from positive to negative. The reference channel and each of the two motion signal channels produce such pulses which are fed to the play amplifiers 52, 141 and 163 which amplify the signal voltages and reconstruct them into square wave voltages.

The square voltage from the reference channel play amplifier 52 is fed to the selsyn exciter 12 which now supplies to the longitudinal and cross-feed motion selsyns 10 and 11 three-wire, three-phase sine wave voltages accurately synchronized in frequency and in phase with the reference square wave voltage which is obtained from the reference channel play amplifier 52. During this playback operation, the selsyn exciter 12 operates in the following manner. As shown in Figs. 2 and 3, the square-shaped reference voltage wave from the reference channel play amplifier 52 is fed into the integrator and wave shaper 53 in which it is integrated to form a triangular shaped voltage wave which is 90 degrees displaced from the input square wave voltage. Non-linear circuits in the wave shaper convert the 90 degree lagging triangular wave shaped voltage into approximately a sine wave voltage which, like the triangular wave shaped voltage, lags the square wave input voltage 90 degrees. This 90 degrees displaced sine wave voltage is directly mixed in the input control circuit of the variable gain amplifier section 13 of the closed loop of the oscillator. This produces a very forceful type of phase synchronization so that the oscillator remains locked with the square wave reference voltage derived from the tape and cannot shift in frequency. Consequently, the selsyn exciter no longer operates as a free-running oscillator as it did during the record operation. The square wave reference voltage is also fed into the frequency discriminator 50 of which the output voltage is a direct voltage proportional to frequency. This direct voltage is supplied to the input control circuit of both variable phase-shift units 14 and 17 which establishes approximately the correct relationship of resistance and capacitance components of the closed loop of the oscillator for operation at the correct operating frequency.

The reference phase discriminator 49 regulates the phase relationship of the three-phase output of the selsyn exciter at the output terminals 26, 27 and 28 with respect to the reference square wave voltage. To one of the two inputs of the reference phase discriminator 49 is supplied a sine wave voltage which is derived from the output terminal 27 of the selsyn exciter and to the other input terminal is supplied the square wave reference voltage produced by the play amplifier 52. The direct voltage which is produced at the output of the phase discriminator 49 is proportional to the phase error between the two input voltages and the polarity of such direct voltage is a function of the relative phase of the two. This direct phase error voltage is supplied simultaneously to the input circuits of the electric valves of both variable phase-shift units 14 and 17 in such sense or polarity as to cause the frequency of the oscillator to increase or decrease as is necessary to maintain minimum phase error between the oscillator output power amplifier 20 and the square wave reference voltage.

In installations in which the tape is played back at a substantially constant speed to produce a reference voltage of substantially constant frequency, the frequency discriminator is unnecessary to successful synchronization and may be disconnected from the control or omitted. For such installations, the slider 42a of the record frequency adjustment potentiometer 42 may be permanently connected to the pivot terminal of the record-play switch 43. With this connection, the frequency adjustment potentiometer would set up the same frequency on playback that is set for record, and this together with the forceful synchronizing produced by the integrator and wave shaper 53 and the highly accurate reference phase discriminator 49 will cause the oscillator to oscillate at this base frequency and remain accurately synchronized to the reference signal derived from the tape.

As previously explained, the quadrature phase discriminator maintains the output voltages of the two power amplifiers 20 and 21 in exact quadrature phase relationship with each other and since the outputs of the two power amplifiers are maintained constant at the correct magnitude by means of the automatic gain controls an exactly balanced three-phase sine wave voltage is produced at the output terminals 26, 27 and 28 of the selsyn exciter.

During the playback operation, as during the record operation, the phase of the voltage induced in the secondary winding of the cross-feed motion selsyn 11 represents the present instantaneous position of the tool on the cross-feed axis. This voltage is supplied to one of the two input circuits of the cross-feed phase discriminator 173. At the same time, a signal voltage is induced in the cross-feed channel coil 160 of the record-playback head, converted into a square wave alternating voltage in the cross-feed amplifier 141 and supplied to the second input terminal of the phase discriminator 173. The phase of this voltage at this instant represents the recorded or the desired position of the tool on the cross-feed axis at such instant.

The cross-feed phase discriminator compares the phases of these two signal voltages which are supplied to its input circuits. As previously explained, the output of the phase discriminator 173 is a direct voltage which is proportional to the phase error between the desired and present position signal voltages. At any instant at which the tool is in the desired position on the cross-feed axis, the output voltage of the phase discriminator should be zero so that zero voltage will be supplied to the cross-feed motor 8. However, the output voltage of the phase discriminator is zero only when the input voltages are displaced from each other 90 degrees in phase. This required 90 degrees phase displacement when the tool is in the desired instantaneous position on the cross-feed is produced by the action of the reference phase discriminator 49 which produces a 90 degrees phase-shift of the output voltage of the selsyn exciter with respect to the reference voltage. Any adjustments that may be necessary to establish an exact 90 degree relationship between the two signal voltages supplied to the two input circuits of the phase discriminator 171 may be effected by rotation of the rotor of the differential selsyn 180 with respect to its stator.

As the tape 44 passes through the record-playback head, the phase of the voltage induced in the cross-feed channel coil 160 of the record-playback head will change in accordance with the phase pattern of the recorded cross-feed voltage.

Consequently, an error tends to develop in the instantaneous position of the tool on the cross-feed which results in a change in the 90 degrees relationship of the voltages supplied to the input circuits of the cross-feed discriminator 171. This produces a voltage at the output of the discriminator of which the magnitude is proportional to the amount of change in phase of the input voltages from the 90 degree relationship and of which the polarity depends upon the sense of the change, i.e. an increase or decrease in the 90 degree relationship. Responsively to this output voltage, the motor 8 is energized for rotation in a direction to reduce the error in the position of the tool and simultaneously to rotate the rotor of the cross-feed selsyn 11 to restore the 90 degree relationship of the input voltages which exists when the present position of the tool coincides with the desired position. Although this position correcting operation is described as a single step taking place in a finite interval of time, it is actually in continuous progress during the playback operation. Thus by tending to reduce the error at all times the system causes the tool to follow the same cross-feed motions that were recorded on the tape.

The correct positioning of the tool on the longitudinal leadscrew is accomplished in a similar manner. The present position signal voltage is induced in the rotor winding of the longitudinal motion selsyn 10 and supplied to one input circuit of the longitudinal phase discriminator 161. Simultaneously, the alternating pattern in the longitudinal channel of the tape 44 induces in the coil 154 a signal voltage which represents the desired longitudinal position of the tool. This voltage is amplified, converted into a square wave control voltage in the play amplifier 163 and supplied to the other input of the longitudinal phase discriminator 158. The manner in which the corrections in the longitudinal position of the tool are made in successive instants of time is identical with that described for the cross-feed and a repetition of the described operation is therefore omitted.

Thus the tool is continuously positioned along the cross and longitudinal leadscrews, following the same program of motion that was recorded on the tape. The result is a piece of work that is identical with the pattern or which conforms the data from which the recording was prepared.

Although in accordance with the provisions of the patent statutes, this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In a programming control system in which a reference alternating control pattern is stored in a data storage medium, means for producing from said reference pattern a reference alternating voltage, an oscillator having an input circuit and a closed loop comprising a resistance-reactance phase-shift network, means coupling said reference alternating voltage to said input circuit and means for synchronizing said oscillator with said reference voltage comprising a phase discriminator for supplying to said network to vary the relationship of the resistance and reactance thereof, a control voltage which is representative of the phase relationship of said reference voltage and an alternating voltage derived from the voltage at a point in said loop.

2. In a programming control system in which a reference alternating control pattern is stored in a data storage medium, means for producing from said control pattern a reference alternating voltage, an oscillator having an input circuit and a closed loop comprising a phase-shift unit having a reactance element and a resistance element, means coupling said reference alternating voltage to said input circuit and means for synchronizing said oscillator with said reference voltage comprising a phase discriminator connected to be responsive to the phase relationship of said reference voltage, and an alternating voltage derived from a point in said loop to supply to said unit to vary one of said elements a direct control voltage which is representative of said phase relationship.

3. In a programming control system in which a reference actuating control pattern is stored in a data storage medium, means for producing from said pattern a reference alternating voltage, an oscillator having an input circuit and a closed loop comprising a resistance-reactance phase-shift unit of which the resistance element comprises the output circuit of an electric valve provided with an input circuit, means coupling said reference alternating voltage to said oscillator input circuit and means for synchronizing said oscillator with said reference voltage comprising a phase discriminator having a first input circuit connected to be supplied from said reference voltage, a second input circuit connected to be supplied with a voltage derived from a point in said loop and having an output circuit connected to supply to the input circuit of said electric valve a voltage representative of the phase relationship between said reference voltage and said voltage at said point in said loop.

4. In a programming control system in which a reference alternating control pattern is stored in a data storage medium, means for producing from said alternating control pattern a reference alternating voltage, an oscillator having a closed loop comprising a first resistance-reactance phase-shift unit, means comprising separate output connections and a second resistance-reactance variable phase-shift unit connected between said connections for deriving from said oscillator two quadrature alternating voltages, and means for synchronizing said oscillator with said reference voltage comprising a phase discriminator connected to produce and supply to said first phase-shift unit to vary the resistance-reactance relationship thereof a control voltage which is representative of the phase relationship of said reference voltage and the voltage at a point in said loop.

5. In a programming control system in which a reference alternating control pattern is stored in a data storage medium, means for producing from said alternating control pattern a reference alternating voltage, an oscillator having a closed loop comprising a first resistance-reactance phase-shift unit, means comprising separate output connections and a second resistance-reactance variable phase-shift unit connected between said connections for deriving from said oscillator two quadrature alternating voltages, and means for counteracting departure of said voltages from said quadrature relationship comprising a quadrature phase discriminator having two input circuits each supplied from a different one of said quadrature voltages and an output circuit connected to supply to one of said phase-shift units to vary its resistance-reactance relationship of control voltage representative of said departure.

6. In a programming control system in which a reference alternating control pattern is stored in a data storage medium, means for producing from said alternating control pattern a reference alternating voltage, an oscillator having a closed loop comprising a first resistance-reactance phase-shift unit, means comprising separate output connections and a second resistance-reactance variable phase-shift unit connected between said connections for deriving from said oscillator two quadrature alternating voltages, and means for counteracting departure of said voltages from said quadrature relationship comprising a quadrature phase discriminator having two input circuits each supplied from a different one of said output voltages and a push-pull connected output connected to supply to said phase-shifting units for oppositely varying their resistance-reactance relationships oppositely varying control voltages representative of said departure.

7. In a programming control system in which a reference alternating control pattern is stored in a data storage medium, means for producing from said alternating control pattern a reference alternating voltage, an oscillator having a closed loop comprising a first resistance-reactance phase-shift unit, means comprising separate output connections and a second resistance-reactance variable phase-shift unit connected between said connections for deriving from said oscillator two quadrature alternating voltages, and means for synchronizing said oscillator with said reference voltage comprising a phase discriminator connected to produce and supply to said first phase-shift unit and second phase-shift units to vary their resistance-reactance relationships in the same sense control voltages representative of the phase relationship between said reference voltage and the voltage at a point in said loop, and means for counteracting deviation of said output voltages from said quadrature relationship comprising a quadrature phase discriminator having two input circuits connected to be separately supplied from said output voltages and having a push-pull connected output connected to supply to said phase-shifting units for oppositely varying their resistance-reactance phase relationships oppositely varying control voltages representative of said deviation.

8. In a programming control system in which a reference alternating control pattern is stored in a data storage medium, means for producing from said control pattern a reference alternating voltage, an oscillator having a closed loop comprising a first variable phase-shift unit, means comprising separate output connections and a second variable phase-shift unit connected between said connections for deriving from said oscillator two quadrature alternating voltages, each of said phase-shift units comprising a reactance element and a variable resistance electric valve provided with an input circuit, means for synchronizing said oscillator with said reference voltage comprising a phase discriminator connected to produce and to supply to said input circuits of said valves to vary the resistance-reactance relationships of said units like polarity control voltages representative of the phase relationship of said reference voltage and the voltage of a point in said loop, and means for counteracting deviation of said output voltages from said quadrature relationships comprising a quadrature phase discriminator having two input circuits each supplied from a different one of said output voltages, and a push-pull connected output circuit connected to supply to said input circuits of said variable resistance valves to effect opposite variation of the reactance-resistance relationship of said units variable control voltages representative of said deviation.

9. In a programming control system in which a reference alternating control pattern is stored in a data storage medium, an oscillator having a closed loop comprising a plurality of resistance-reactance phase-shift units, the resistance element of each of said units comprising the output circuit of a variable resistance electric valve having an input circuit, and means for synchronizing the voltage at a point in said loop with a reference voltage produced from said alternating magnetization pattern comprising a phase discriminator connected to produce and supply to said input circuits a direct control voltage representative of the phase relationship of said reference voltage and the voltage of said point in said closed loop.

10. In combination, an oscillator having a closed loop comprising a network of resistance and reactance elements, connections for deriving from said network two output alternating voltages substantially in quadrature with each other, and means for maintaining the quadrature relationship of said voltages comprising a quadrature phase discriminator having two input circuits connected to be supplied from said output voltages, and an output circuit connected to supply to said network to vary the relationship of said resistance and reactance elements a control voltage which is representative of the departure from quadrature of the phase relationship between said alternating voltages.

11. In combination, an oscillator having a closed loop comprising a variable phase-shift unit having a reactance element and a resistance element, connections for deriving from said loop two output alternating voltages substantially in quadrature with each other, a second variable phase-shift unit connected between said output connections having a reactance element and a resistance element, and means for counteracting deviations from said quadrature relationship of said voltages comprising a quadrature phase discriminator having two input circuits each connected to be supplied from a different one of said output voltages, and an output circuit connected to supply to said second phase-shift unit to vary the resistance-reactance relationship thereof a direct control voltage representative of said deviations from quadrature of the phase relationship of said output voltages.

12. In combination, an oscillator having a closed loop comprising a first variable phase-shift unit, means comprising separate output connections and a second variable phase-shift unit connected between said connections for deriving from said loop two output alternating voltages substantially in quadrature with each other, each of said phase-shift units comprising a reactance element and a variable resistance electric valve provided with an input circuit and means for counteracting deviations from said quadrature relationship of said voltages comprising an electric valve-type quadrature phase discriminator having two input circuits each supplied from a different one of said output circuits, and a push-pull connected output circuit connected to supply to the input circuits of said variable resistance valves for oppositely varying the resistance-reactance relationship of said phase-shift units opposite polarity direct control voltages representative of said deviations.

13. In combination, an oscillator having a closed loop comprising a pair of phase-shift units each containing resistance and reactance elements, connections for deriving from said loop two alternating voltages substantially in quadrature and means for counteracting departure of said voltages from quadrature comprising a phase discriminator having two input circuits each supplied from a different one of said quadrature voltages and a push-pull connected output circuit connected to supply to two of said phase-shift units oppositely varying direct control voltages for oppositely varying the relationships of the resistance and reactance elements of said two units, thereby to counteract departure of said alternating voltages from quadrature without varying the overall phase-shift in said loop.

14. In a programming control system in which a reference alternating control pattern is stored in a data storage medium, means for producing from said control pattern a reference alternating voltage, an oscillator having an input circuit and a closed loop comprising a resistance-reactance phase-shift network, and means for synchronizing said oscillator with said reference voltage comprising connections from said reference voltage producing means for supplying to said input circuit an alternating voltage derived from said reference voltage.

15. In a programming control system in which a reference alternating control pattern is stored in a data storage medium, means for producing from said alternating control pattern a reference alternating voltage, an oscillator having an input circuit and a closed loop comprising a first resistance-reactance phase-shift unit, means comprising separate output connections and a second resistance-reactance variable phase-shift unit connected between said connections for deriving from said oscillator two output quadrature phase alternating voltages, means for synchronizing said oscillator with said reference voltage comprising connections for supplying to said input circuit of said oscillator an alternating voltage derived from said reference voltage and a phase discriminator having a first input circuit connected to be supplied from said reference voltage, a second input circuit connected to be supplied from an alternating voltage derived from a point in said loop and an output circuit connected to supply to said first phase-shift unit to vary the resistance-reactance relationship thereof a control voltage which is representative of the phase relationship of said reference voltage and the voltage at said point in said loop, and means for counteracting departure of said output voltages from said quadrature relationship comprising a quadrature-phase discriminator having two input circuits each supplied from a different one of said output voltages, and having an output circuit connected to supply to said second phase-shift unit to vary the resistance-reactance relationship thereof a direct control voltage representative of the departure of said voltages from quadrature.

16. In a programming control system in which a square wave alternating control pattern is stored in a data storage medium, means for producing from said square wave control pattern a reference square wave alternating voltage, an oscillator having an input circuit and a closed loop comprising a resistance-reactance phase-shift network, and means for synchronizing said oscillator with said reference voltage comprising means for supplying to said input circuit a sine wave alternating voltage derived from said square wave reference voltage, and a phase discriminator having a first input circuit connected to be supplied from an alternating voltage derived from a point in said loop, a second input circuit connected to be supplied from said square wave reference voltage, and an output circuit connected to supply to said network to vary the resistance-reactance relationship thereof, a control voltage representative in magnitude and polarity of the magnitude and sense respectively of the phase relationship of said reference voltage and said voltage derived from said point in said loop.

17. In a programming control system, means for producing from a square wave control pattern stored in a data storage medium a reference square wave alternating voltage, an oscillator having an input circuit and a closed loop comprising a resistance-reactance phase-shift network, and means for synchronizing said oscillator with said reference voltage comprising an integrator and wave shaper for deriving from said square wave reference voltage and supplying to said input circuit an approximate sine wave voltage.

18. In a programming control system, means for producing from a square wave control pattern stored on a data storage medium a reference square wave alternating voltage, an oscillator having an input circuit and a closed loop comprising a resistance-reactance phase-shift network, and means for synchronizing said oscillator with said reference voltage comprising an integrator and wave shaper for deriving from said square wave reference voltage and supplying to said input circuit an approximate sine wave voltage, and a phase discriminator having a first input circuit connected to be supplied from said square wave reference voltage, a second input circuit connected to be supplied from a sine wave alternating voltage derived from a point in said loop, and an output circuit connected to supply to said network to vary the resistance-reactance relationship thereof a direct control voltage representative of the phase relationship of said reference voltage and said voltage at said point in said loop.

19. In a programming control system in which a square wave alternating control pattern is stored in a data storage medium, means for producing from said alternating control pattern a reference alternating voltage, an oscillator having an input circuit and a closed loop comprising a first phase-shift unit having resistance and reactance components, means comprising separate output connections and a second resistance-reactance variable phase-shift unit between said connections for deriving from said oscillator two quadrature alternating voltages, means for synchronizing said oscillator with said reference voltage comprising a phase discriminator connected to supply to said first phase-shift unit to vary the relationship of its resistance and reactance components a control voltage representative of the phase relationship of said reference voltage and the voltage at a point in said loop, a separate power amplifier included in each of said output connections, and means for maintaining the output voltages of each of said power amplifiers substantially constant comprising a source of constant magnitude reference voltage and a rectifier connected to be responsive to the difference of said constant reference voltage and the output voltage of the associated power amplifier for supplying to the input circuit thereof a negative feedback voltage representative of said difference.

20. In a programming control system in which a square wave control pattern is stored in a data storage medium, means for producing from said pattern a reference alternating voltage, an oscillator having an input circuit and a closed loop comprising a first variable gain amplifier and a variable phase-shift unit having resistance and reactance components, means comprising separate output connections and a second variable gain amplifier and a second resistance-reactance variable phase-shift unit connected between said output connections for deriving from said oscillator two quadrature phase alternating voltages, means for synchronizing said oscillator with said reference voltage comprising a phase discriminator having a first input circuit connected to be supplied from said reference voltage, a second input circuit connected to be supplied from an alternating voltage derived from a point in said loop, and an output circuit connected to supply to said phase-shift units to vary their resistance-reactance relationships a direct control voltage representative of the phase relationship of said reference voltage and said alternating voltage at said point in said loop, a pair of power amplifiers each included in a different one of said output connections, and means for maintaining the output voltages of said power amplifiers substantially constant comprising a source of constant reference voltage and a pair of automatic gain control rectifiers, a different one for each of said power amplifiers and each connected to be responsive to the difference of said constant reference voltage and the output of the associated power amplifier for supplying to the input of the associated variable gain amplifier a control voltage representative of said difference thereby to cause said variable gain amplifiers to supply corresponding negative feedback voltages to said power amplifiers.

21. In a programming control system in which an alternating control pattern is stored in a data storage medium, means for producing from said alternating control pattern a reference alternating voltage, an oscillator having a closed loop comprising a pair of variable gain electric valve amplifiers and a pair of variable phase-shift units with said phase-shift units and said amplifiers alternating with each other in said loop, each of said phase-shift units comprising a reactance element and a variable resistance electric valve provided with an input circuit, means for deriving from said oscillator two quadrature phase alternating voltages comprising a first output connection between a first variable gain amplifier and a first variable phase-shift unit and a second output connection between the second variable gain amplifier and the second phase-shift unit, means for synchronizing said oscillator with said reference voltage comprising a phase-discriminator connected to supply to said input circuits a direct control voltage representative of the phase relationship of said reference voltage and the voltage at a point in said loop, and connections for supplying to the input circuits of said amplifiers an alternating voltage derived from said alternating reference voltage, a pair of power amplifiers, each included in a different one of said output connections, means for maintaining the output voltage of said power amplifiers substantially constant comprising a source of constant magnitude reference voltage and a pair of automatic gain control rectifiers, a different one for each of said power amplifiers and each connected to be responsive to the difference of said constant reference voltage and the output voltage of its associated power amplifier for varying the input bias of the associated variable gain amplifier.

22. In a programming control system in which an alternating control pattern is stored in a data storage medium, an oscillator having a closed loop comprising a variable phase-shift unit having resistance and reactance components, means for producing from said alternating control pattern a reference alternating voltage and means for synchronizing said oscillator with said reference voltage comprising a frequency discriminator connected to be supplied from said voltage producing means for supplying to said variable phase-shift unit to vary the resistance-reactance relationship thereof, a control voltage representative of the magnitude of the frequency of said reference voltage and a phase discriminator connected to be responsive to the phase relationship of said reference voltage and the alternating voltage derived from a point in said loop for supplying to said unit to vary the resistance-reactance relationship thereof a control voltage representative of said phase relationship.

23. In a programming control system in which a reference alternating control pattern is stored in a data storage medium, means for producing from said alternating pattern a reference alternating voltage, an oscillator having a closed loop comprising a phase-shift network having resistance and reactance components of which the resistance component comprises the output circuit of a variable resistance electric valve having an input circuit, means for synchronizing said oscillator with said reference voltage comprising a frequency discriminator connected to be supplied from said voltage producing means for supplying to said input circuit to vary the reactance-resistance relationship of said network a control voltage representative of the magnitude of the frequency thereof and a phase discriminator having a first input circuit connected to be supplied from said reference voltage, a second input circuit connected to be supplied from an alternating voltage derived from a point in said loop, and an ouput circuit connected to supply to said input circuit to vary the reactance-resistance relationship of said network, a control voltage representative of the difference in phase of said reference voltage and said derived voltage.

24. In a programming control system in which an alternating control pattern is stored in a data storage medium, means for producing from said control pattern a reference alternating voltage, an oscillator having an input control circuit and a closed loop comprising a phase-shift network having resistance and reactance components, and means for synchronizing said oscillator with said reference voltage comprising connections from said voltage producing means for supplying to said input circuit a voltage derived from said reference voltage, and a frequency discriminator connected to be supplied from said voltage producing means for supplying to said network to vary the relationship of said reactance and resistance components thereof, a direct control voltage representative of the magnitude of the frequency of said reference voltage.

25. In a programming control system in which a reference alternating control pattern is stored in a data storage medium, means for producing from said alternating control pattern a reference alternating voltage, an oscillator provided with an input circuit and having a closed loop comprising a variable phase-shift unit having reactance and resistance components, means comprising separate output connections and a second resistance-reactance variable phase-shift unit connected between said output connections for deriving from said loop two quadrature alternating voltages, and means for synchronizing said oscillator with said reference voltage comprising connections from said reference voltage producing means for supplying to said input circuit an alternating voltage derived from said reference voltage, and a frequency discriminator connected to be supplied from said voltage producing means for supplying to said variable phase-shift units to vary the resistance-reactance relationship thereof a control voltage representative of the magnitude of the frequency of said reference voltage.

26. In a programming control system in which an alternating control pattern is stored in a data storage medium, means for producing from said alternating control pattern a reference alternating voltage, an oscillator provided with an input control circuit and having a closed loop comprising a resistance-reactance phase-shift unit, means comprising separate output connections and a second resistance-reactance variable phase-shift unit for deriving from said oscillator two quadrature output alternating voltages, means for synchronizing said oscillator with said reference voltage comprising connections from said reference voltage producing means for supplying to said input circuit an alternating voltage derived from said reference voltage and a frequency discriminator supplied from said reference voltage producing means for supplying to said variable phase-shift units to vary the resistance-reactance relationships thereof control voltages representative of the magnitude of the frequency of said reference voltage, and means for counteracting departures of said output voltages from quadrature comprising a quadrature phase discriminator having two input circuits supplied from said output voltages and an output circuit connected to supply to said phase-shifting units to vary the resistance-reactance relationship thereof a control voltage representative of the deviation of said output voltages from quadrature.

27. In a programming control system in which an alternating control pattern is stored in a data storage medium, means for producing from said alternating control pattern a reference alternating voltage, an oscillator having an input circuit and a closed loop comprising a variable phase-shift unit having resistance and reactance components, and means for synchronizing said oscillator with said reference voltage comprising connections from said reference voltage producing means for supplying to said input circuit a voltage derived from said reference voltage, a frequency discriminator connected to be supplied from said reference voltage producing means for supplying to said variable phase-shift unit to vary the resistance-reactance relationship thereof a control voltage representative of the magnitude of the frequency of said reference voltage and a phase discriminator connected to be responsive to the phase relationship of said reference voltage and the alternating voltage derived from a point in said loop for supplying to said unit to vary the resistance-reactance relationship thereof a control voltage representative of said phase relationship.

References Cited in the file of this patent

UNITED STATES PATENTS

| | | |
|---|---|---|
| 2,015,178 | Frum | Sept. 24, 1935 |
| 2,537,770 | Livingston | Jan. 9, 1951 |
| 2,598,370 | Gruen | May 27, 1952 |
| 2,610,297 | Leed | Sept. 9, 1952 |
| 2,707,233 | Norton | Apr. 26, 1955 |